United States Patent
Zha et al.

(10) Patent No.: US 11,332,592 B2
(45) Date of Patent: May 17, 2022

(54) METHOD FOR PREPARING EXTRUDED POLYAMIDE FOAMS

(71) Applicant: AdvanSix Resins & Chemicals LLC, Parsippany, NJ (US)

(72) Inventors: Min Zha, Shanghai (CN); Min Wang, Shanghai (CN)

(73) Assignee: AdvanSix Resins & Chemicals LLC, Parsippany, NJ (US)

( * ) Notice: Subject to any disclaimer, the term of this patent is extended or adjusted under 35 U.S.C. 154(b) by 259 days.

(21) Appl. No.: 16/649,780

(22) PCT Filed: Sep. 25, 2018

(86) PCT No.: PCT/US2018/052562
§ 371 (c)(1),
(2) Date: Mar. 23, 2020

(87) PCT Pub. No.: WO2019/067400
PCT Pub. Date: Apr. 4, 2019

(65) Prior Publication Data
US 2020/0317878 A1    Oct. 8, 2020

(30) Foreign Application Priority Data
Sep. 27, 2017   (WO) ................ PCT/CN2017/103574

(51) Int. Cl.
*C08J 9/16*    (2006.01)
*C08J 9/04*    (2006.01)
(Continued)

(52) U.S. Cl.
CPC ............ *C08J 9/0061* (2013.01); *C08J 9/122* (2013.01); *C08J 2201/026* (2013.01);
(Continued)

(58) Field of Classification Search
CPC .... C08J 9/0061; C08J 9/122; C08J 2201/026; C08J 2201/03; C08J 2203/06;
(Continued)

(56) References Cited

U.S. PATENT DOCUMENTS

2009/0046406 A1    2/2009   Chan et al.
2011/0294910 A1*  12/2011   Kriha ..................... B29B 9/065
                                                                521/59
(Continued)

FOREIGN PATENT DOCUMENTS

CN    200950534 Y    9/2007
CN    201041938 Y    3/2008
(Continued)

OTHER PUBLICATIONS

International Preliminary Report on Patentability received for PCT Patent Application No. PCT/CN2017/103574, dated Jun. 20, 2018, 12 pages (6 pages of English Translation and 6 pages of Original Document).
(Continued)

*Primary Examiner* — Kara B Boyle
(74) *Attorney, Agent, or Firm* — Faegre Drinker Biddle & Reath LLP

(57) ABSTRACT

A continuous method of producing polyamide foams by an extrusion foaming process is disclosed. The polyamide foam includes a polyamide resin compounded with a composite
(Continued)

chain extender including an epoxy chain extender and a maleic anhydride grafted polypropylene (MAPP) wax. The produced polyamide foams have improved properties, including a smooth surface, low density, and small cell size.

14 Claims, 20 Drawing Sheets

(51) Int. Cl.
*C08J 9/12* (2006.01)
*C08J 9/00* (2006.01)

(52) U.S. Cl.
CPC ........ *C08J 2201/03* (2013.01); *C08J 2203/06* (2013.01); *C08J 2203/08* (2013.01); *C08J 2377/00* (2013.01); *C08J 2400/104* (2013.01); *C08J 2451/06* (2013.01)

(58) Field of Classification Search
CPC ................ C08J 2203/08; C08J 2377/00; C08J 2400/104; C08J 2451/06; C08J 9/0023; B29C 48/405; B29C 48/41; B29C 48/0012; C08L 77/00; C08L 23/12; C08L 23/26; C08L 51/06; C08K 5/1515
See application file for complete search history.

(56) References Cited

U.S. PATENT DOCUMENTS

| 2016/0032068 | A1* | 2/2016 | Nakagawa | C08J 9/34 |
| | | | | 521/183 |
| 2017/0253710 | A1* | 9/2017 | Smith | C08J 9/232 |
| 2017/0259474 | A1* | 9/2017 | Holmes | C08J 9/36 |

FOREIGN PATENT DOCUMENTS

| CN | 103360759 A | 10/2013 |
| CN | 104821554 A | 8/2015 |
| CN | 105226604 A | 1/2016 |
| CN | 206452095 U | 8/2017 |
| JP | 2000-103960 A | 4/2000 |

OTHER PUBLICATIONS

International Preliminary Report on Patentability received for PCT Patent Application No. PCT/US2018/052562, dated Apr. 9, 2020, 8 pages.
International Search Report and Written Opinion received for PCT Patent Application No. PCT/CN2017/103574, dated Feb. 27, 2018, 14 pages (7 pages of English Translation and 7 pages of Original Document).
International Search Report and Written Opinion received for PCT Patent Application No. PCT/US2018/052562, dated Nov. 27, 2018, 10 pages.

* cited by examiner

Example 4 (H - 42000 Pa.S)

Example 5 (H - 42000 Pa.S)

Example 6 (K - 48000 Pa.S)

Example 1 (G - 140000 Pa.S)

Bubble size: ~ 500μm
Density: 0.2410 g/cm3
Expansion ratio: 4.6

Example 2 (D - 96000 Pa.S)

Bubble size: ~ 200μm
Density: 0.8417 g/cm3
Expansion ratio: 1.3

Example 3 (F - 78000 Pa.S)

Bubble size: ~ 400μm
Density: 0.2907 g/cm3
Expansion ratio: 3.8

Example 4 (H - 42000 Pa.S)

Bubble size: ~ 300μm
Density: 0.2488 g/cm3
Expansion ratio: 4.4

Example 5 (H - 42000 Pa.S)

Bubble size: ~100μm
Density: 0.1373 g/cm3
Expansion ratio: 8.3

Example 6 (K - 48000 Pa.S)

Bubble size: ~600μm
Density: 0.3582 g/cm3
Expansion ratio: 3.1

Example 8 (M - 2950 Pa.S)

Density: 0.2680 g/cm3
Expansion ratio: 4.2

Example 9 (A - 1500 Pa.S)

Failed to be foamed

Example 1 (G - 140000 Pa.S)

Smooth surface

Example 3 (F - 78000 Pa.S)

Smooth surface

Example 1 (G - 140000 Pa.S)

Bubble size: ~ 500μm
Density: 0.2410 g/cm3
Expansion ratio: 4.6

Example 3 (F - 78000 Pa.S)

Bubble size: ~ 400μm
Density: 0.2907 g/cm3
Expansion ratio: 3.8

Surface morphology - Example 2 (D - 96000 Pa.S)

Rough surface

Cross section view - Example 2 (D - 96000 Pa.S)

Bubble size: ~ 200μm
Density: 0.8417 g/cm3
Expansion ratio: 1.3

Surface morphology - Example 6 (K - 48000 Pa.S)

Rough surface

Cross section view - Example 6 (K - 48000 Pa.S)

Bubble size: ~ 600μm
Density: 0.3582 g/cm3
Expansion ratio: 3.1

Example 8 (M - PA6/66, 2950 Pa.S)

Density: 0.268 g/cm3
Expansion ratio: 4.2

Example 9 (A-H95ZIT, 1500 Pa.S)

Failed to be foamed

Example 8 (M - PA6/66, 2950 Pa.S)

Rough surface

Example 9 (A-H95ZIT, 1500 Pa.S)

Rough surface

Example 4 (H - 42000 Pa.S)

Smooth surface

Example 6 (H - 48000 Pa.S)

Rough surface

Example 4 (H - 42000 Pa.S)

Bubble size: ~300μm
Density: 0.2488 g/cm3
Expansion ratio: 4.4

Example 6 (H - 48000 Pa.S)

Bubble size: ~600μm
Density: 0.3582 g/cm3
Expansion ratio: 3.1

Before (Example 4, H - 42000 Pa.S)

Bubble size: ~ 300μm
Density: 0.2488 g/cm3
Expansion ratio: 4.4

After (Foaming process changed, H - 42000 Pa.S)

Bubble size: ~ 100μm
Density: 0.1281 g/cm3
Expansion ratio: 8.8

Surface morphology - Example 5 (H - 42000 Pa.S)

Smooth surface

Cross section view - Example 5 (H - 42000 Pa.S)

Bubble size: ~100μm
Density: 0.1373 g/cm3
Expansion ratio: 8.3

METHOD FOR PREPARING EXTRUDED POLYAMIDE FOAMS

CROSS-REFERENCE TO RELATED APPLICATION

This application is a U.S. 371 application of International Application No. PCT/US2018/052562, filed 25 Sep. 2018, which claims priority to PCT/CN2017/103574, filed 27 Sep. 2017, the entire disclosures of which are expressly incorporated by reference herein.

FIELD OF THE DISCLOSURE

The present disclosure provides a method for producing polyamide foams by an extrusion foaming process where the polyamide foams produced have improved properties.

BACKGROUND

Polyamides are formed from precursors such as caprolactam via hydrolysis, polyaddition, and polycondensation reactions. For polyamide-6 materials formed from caprolactam, hydrolysis opens the ring of the caprolactam monomer forming two end groups, including one amine end group and one carboxyl end group. Polyaddition combines caprolactam monomers into intermediate molecular weight oligomers, and polycondensation combines oligomers into higher molecular weight polymers.

Polyamide 6 (PA6) foams can be prepared by various methods including extruding PA 6 base resins with a blowing agent. However, it may be difficult to produce PA6 foams with low density and small cell size via extrusion due to the high extrusion temperature and poor melting strength of PA 6. Improvements in the foregoing are desired.

SUMMARY

The present disclosure provides a continuous method of producing polyamide foams by an extrusion foaming process. The polyamide foam includes a polyamide resin compounded with a composite chain extender including an epoxy chain extender and a maleic anhydride grafted polypropylene (MAPP) wax. The produced polyamide foams have improved properties, including a smooth surface, low density, and small cell size.

In one form thereof, the present invention provides a polyamide foam composition, including a polyamide resin and a composite chain extender including an epoxy chain extender and a maleic anhydride grafted polypropylene (MAPP) wax.

The polyamide resin may be present in an amount of between 92 wt. % and 98 wt. %, based on the total weight of the polyamide foam composition. The epoxy chain extender may be present in an amount of between 1 wt. % and 3 wt. &, based on the total weight of the polyamide foam composition. The MAPP wax may be present in an amount between 1 wt. % and 5 wt. %, based on the total weight of the polyamide foam composition.

The polyamide foam composition may have an average cell size between 50 µm and 700 µm, a shear viscosity between 10,000 Pa·s to 150,000 Pa·s, and/or a density between 0.1 g/cm³ and 1.0 g/cm³. The polyamide foam composition may further include at least one additive selected from antioxidants, nucleating additives, pigments, fire retardants, antistatic additives, and ultraviolet (UV) stabilizers.

In another form thereof, the present invention provides a method of producing a polyamide foam composition, including the steps of: a compounding step, including feeding a polyamide resin and a maleic anhydride grafted polypropylene (MAPP) wax into an extruder at a first location; and feeding an epoxy chain extender into the extruder at a second location downstream from the first location to form a compounded polyamide; and an extrusion foaming step, including extruding the compounded polyamide with a blowing agent in an extruder to form a polyamide foam.

The compounding step may further include, after the feeding step, the additional steps of cooling the compounded polyamide; drying the compounded polyamide; and pelletizing the compounded polyamide. The compounding step may be carried out using a co-rotating twin screw extruder, a counter-rotating intermeshing twin screw extruder or a single screw extruder.

The extrusion foaming step may further include the additional steps of feeding the compounded polyamide into the extruder at a first location; adding a physical blowing agent to the compounded polyamide in the extruder at a second location downstream of the first location; mixing the compounded polyamide and the blowing agent in a static mixer; and conveying the compounded polyamide and the blowing agent through a die to form the polyamide foam composition.

The blowing agent may be supercritical carbon dioxide. The polyamide foam composition may include polyamide resin in an amount between 92 wt. % and 98 wt. %; epoxy chain extender in an amount between 1 wt. % and 3 wt. %; and MAPP wax in an amount between 1 wt. % and 5 wt. %, based on the total weight of the polyamide foam composition. The polyamide foam composition may have at least one of the following properties: an average cell size between 50 µm and 700 µm; a shear viscosity between 10,000 Pa·s to 150,000 Pa·s; and a density between 0.1 g/cm³ and 1.0 g/cm³.

BRIEF DESCRIPTION OF THE DRAWINGS

The above mentioned and other features of the disclosure, and the manner of attaining them, will become more apparent and the disclosure itself will be better understood by reference to the following description of embodiments of the disclosure taken in conjunction with the accompanying drawings.

Corresponding reference characters indicate corresponding parts throughout the several views. The exemplifications set out herein illustrate exemplary embodiments of the disclosure and such exemplifications are not to be construed as limiting the scope of the disclosure in any manner.

DETAILED DESCRIPTION

Figure 1:
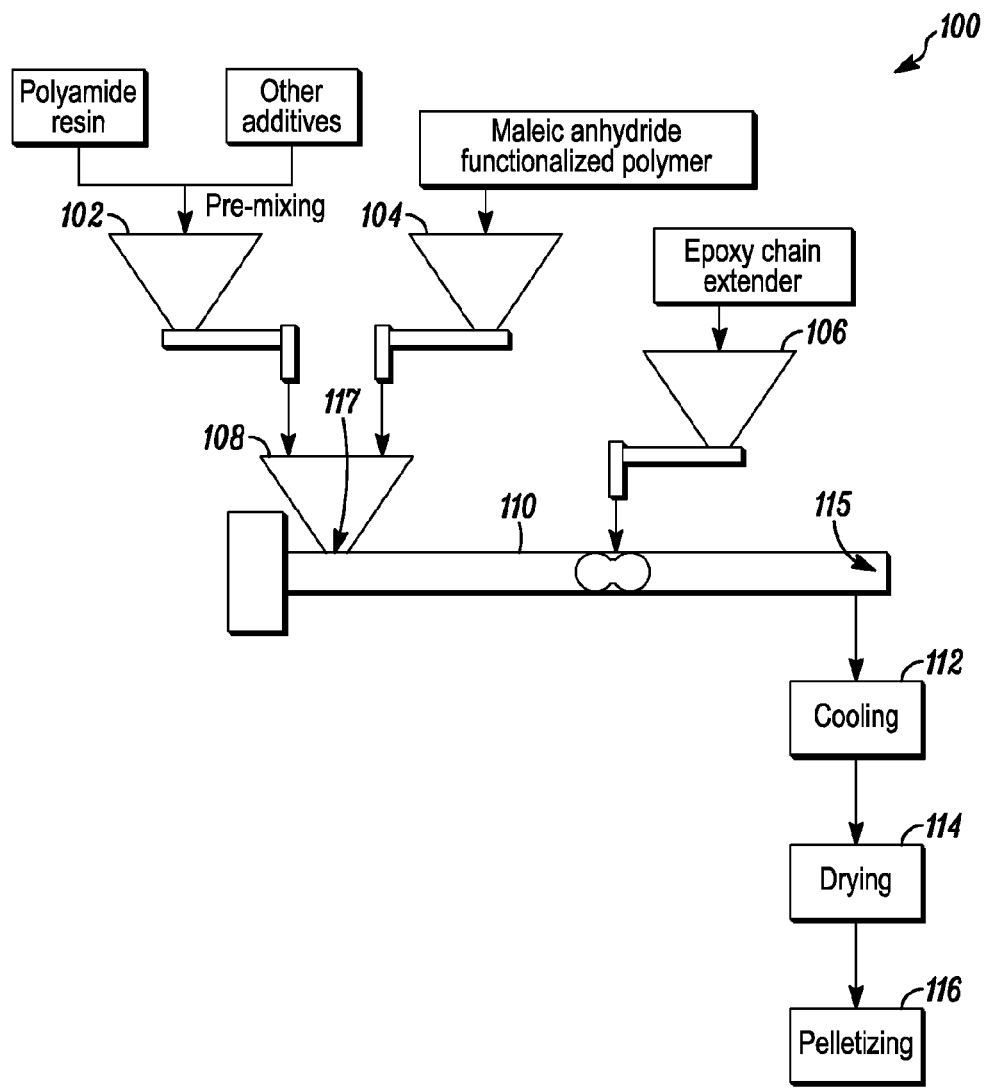
FIG. 1 is a schematic of a compounding extruder showing the compounding of a polyamide resin in accordance with the present disclosure.

The present disclosure provides a continuous method of producing polyamide foams by an extrusion foaming process. The polyamide foam includes a polyamide resin compounded with a composite chain extender including an epoxy chain extender and a maleic anhydride grafted polypropylene (MAPP) wax. The produced polyamide foams have improved properties, including a smooth surface, low density, and small cell size.

1. Components of the Polyamide Foam Compositions

The present polyamide foam compositions are formed from a polyamide resin which has been compounded with certain additives that promote the desirable foam structure described herein. Generally, the compounded polyamide resin includes a polyamide base resin, a composite chain extender including an epoxy chain extender and a maleic anhydride grafted polypropylene (MAPP) wax, and other additives.

a. Polyamide Base Resin

The polyamide base resin is the bulk resin or majority component of the ultimate foamed composition, and may be in the form of a PA 6 polymer formed from caprolactam monomers, a PA 66 polymer formed from hexamethylene diamine and adipic acid monomers, or a PA 6/66 copolymer, for example. Other types of polyamide polymers may also be used, as well as combinations of different types of polyamide polymers.

PA 6/66 copolymers are synthesized from both caprolactam monomers and adipic acid/hexamethylene diamine monomers. The adipic acid and hexamethylene diamine components of the adipic acid/hexamethylene diamine monomers may be provided in a salt of 1:1 molar proportion, referred to as "AH salt", which may be either in solid form or in the form of an aqueous solution. Typically, caprolactam monomers and AH salt monomers are polymerized together to produce PA 6/66 copolymers including a majority component of monomers based on caprolactam and a minority component of monomers based on AH salt, i.e., adipic acid and hexamethylene diamine. In this manner, the polymer chains of polyamide 6/66 copolymers include monomers, or repeating units, based on caprolactam and monomers, or repeating units, based on adipic acid/hexamethylene diamine which may be mutually present in the polymer chains according to a random or near random distribution.

The polyamide base resin may have a relative viscosity (RV) as little as 2.6, 2.8, 3.0, or 3.2, or as great as 3.6, 3.8, 4.0, or 4.2, or within any range defined between any two of the foregoing values, such as between 2.6 and 4.2, 2.8 and 4.0, 3.0 and 3.8, and 3.2 and 3.6, for example, as determined by a viscometer according to ASTM D798.

In some exemplary embodiments, the polyamide base resin is present in an amount as little as 90 wt. %, 92 wt. %, or 94 wt. %, or as great as 96 wt. %, 98 wt. %, or 99 wt. % of the total weight of the ultimate polyamide foam composition, including all additives, or may be present within any range defined between any two of the foregoing values, such as between 90 wt. % and 99 wt. %, between 92 wt. % and 98 wt. %, or between 94 wt. % and 96 wt. %, for example.

b. Composite Chain Extender

The polyamide base resin is compounded with a composite chain extender which, as described below, is a combination of an epoxy chain extender and a maleic anhydride grafted polypropylene (MAPP) wax.

The first component of the composite chain extender is an epoxy compound. The epoxy groups of the epoxy compound may react with the amine end groups and the carboxyl end groups of the polyamide chains of the polyamide base resin. When the epoxy chain extender includes two or more epoxy groups, the chain extender may react with the end groups of the polyamide base resin to make the polyamide chains grow longer and/or to branch the polyamide chains, which results in an increase in the intrinsic viscosity of the compounded polyamide. Exemplary epoxy chain extenders include a styrene-GMA copolymer containing epoxy groups which has a density of 0.92 g/cm$^3$ and has a weight average molecular weight (Mw) of less than 25,000. Exemplary epoxy chain extenders include an aliphatic ester copolymer containing active functional groups.

In some exemplary embodiments, epoxy chain extender of the polyamide foam composition is present in an amount as little as 1 wt. %, 1.5 wt. %, or 2 wt. %, or as great as 2.5 wt. %, 3 wt. %, or 5 wt. %, or within any range defined between any two of the foregoing values, such as between 1 wt. % and 5 wt. %, 1 wt. % and 3 wt. %, or 1.5 wt. % and 2.5 wt. %, for example, based on the total weight of the polyamide foam composition.

The second component of the composite chain extender is a maleic anhydride grafted polypropylene (MAPP) wax. Maleic anhydride groups may react with the amine end groups of the polyamide chains. The MAPP wax may include a high amount of reactive functional maleic anhydride groups, and the reaction of the chain extender with the amine end groups of the polyamide makes the polyamide chains grow longer and/or branches the polyamide chains, which results in an increase in the intrinsic viscosity of the compounded polyamide.

In some embodiments, the MAPP wax has a content of maleic anhydride content greater than 1 wt. %, greater than 2 wt. %, greater than 5 wt. %, greater than 7 wt. %, greater than 9 wt. %, or greater than 10 wt. % based on the total weight of the MAPP wax.

Exemplary MAPP waxes have a number average molecular weight (Mn) as little as 500 g/mol, 1000 g/mol, or 2000 g/mol, or as high as 10000 g/mol, 15000 g/mol, or 20000 g/mol, or within any range defined between any two of the foregoing values, such as 500 g/mol to 20000 g/mol, 2000 g/mol to 15000 g/mol, or 2000 g/mol to 10000 g/mol, for example.

In some exemplary embodiments, the MAPP wax is present in an amount as little as 1 wt. %, 1.5 wt. %, or 2 wt. %, or as great as 2.5 wt. %, 3 wt. %, or 5 wt. %, or within any range defined between any two of the foregoing values, such as between 1 wt. % and 5 wt. %, 1 wt. % and 3 wt. %, or 1.5 wt. % and 2.5 wt. %, for example, based on the total weight of the polyamide foam composition.

c. Other Additives

In some exemplary embodiments, the polyamide foam composition contains additional additives. Exemplary additives may include antioxidants, nucleating additives, pigments, fire retardants, antistatic additives, ultraviolet (UV) stabilizers, and other suitable additives such as heat stabilizers and flexibilizers. Lubricants and anti-wear additives may be also be added as desired.

Exemplary heat stabilizers include copper iodide, potassium iodide, potassium bromide, sodium iodide, potassium chloride, other copper halides, and other metallic halides. Exemplary UV stabilizers may include a hindered amine light stabilizer ("HALS"), such as N,N'-Bis-2,2,6,6-tetramethyl-4-piperidinyl-1,3-benzene dicarboxamide, for example. Exemplary flexibilizers may include polyolefins and polystyrene flexibilizers, such as polyolefin elastomers, for example. Exemplary nucleating additives may include small size talcum powder, silicon dioxide powder, aluminium oxide powder and montmorillonoid powder. Exemplary fire retardants may include tripolycyanamide, antimonous oxide, zinc borate, and brominated flame retardant, such as decabromodiphenyl ether and decabromodiphenyl ethane, for example; and may also include phosphorus flame retardants, such as red phosphorus, for example. Exemplary antioxidants include amine antioxidants, such as diphenylamine, p-phenylenediamine, and dihydro-quinoline; and may also include hindered phenol antioxidants, such as 2,6-di-tert-butyl-4-methylphenol and pentaerythrotol, for example. Exemplary antistatic additives include alkyl sulfonic acid alkali metal salt and aminodithioformic acid alkali metal salt, for example.

In some embodiments, the other additives of the polyamide foam composition comprises as little as 0 wt. %, 0.5 wt. %, 1.0 wt. %, 1.5 wt. %, or 2.0 wt. %, or as great as 2.5 wt. %, 3.0 wt. %, 3.5 wt. %, 4.0 wt. %, 4.5 wt. %, or 5.0 wt. %, or within any range defined between any two of the foregoing values, such as 0 wt. % to 5.0 wt. %, 0.5 wt. % to 4.5 wt. %, 1.0 wt. % to 4.0 wt. %, 1.5 wt. % to 3.5 wt. %, or 2.0 wt. % to 2.5 wt. %, for example, based on the total weight of the polyamide foam composition.

2. Method of Producing the Polyamide Foam Compositions

A method of producing the polyamide foam compositions is disclosed herein. The exemplary method generally includes a compounding step, in which the base polyamide resin is compounded with the additional components discussed above, and an extrusion foaming step, in which the compounded polyamide composition is extruded with a blowing agent to form a polyamide foam.

a. Compounding

The polyamide foam composition is prepared by a compounding apparatus 100, shown in FIG. 1, which includes a compounding extruder 110. Compounding extruder 110 may be a co-rotating twin-screw extruder or a counter-rotating inter-meshing twin screw extruder, for example, and is used to implement a reactive extrusion, and has greater productivity, a simpler deign, and is more productive than using a batch reactor.

As shown in FIG. 1, raw polyamide, in the form of polyamide resin pellets or chips, for example, as well as other additives such as antioxidants or nucleating agents, are premixed and added into feeder 102. Maleic anhydride functionalized polymer (e.g. maleic anhydride grafted polypropylene or ethylene-octene elastomer grafted maleic anhydride) is added into feeder 104. The compounds in feeders 102 and 104 are fed into main hopper 108 and thence into compounding extruder 110 at a first location located generally upstream with respect to the compounding extruder 110.

The epoxy chain extender is fed to compounding extruder 110 through side feeder 106 and mixed with the polyamide composite in compounding extruder 110, which is completely melted at this location within compounding extruder 110. Epoxy chain extender is advantageously fed from side feeder 106, located downstream of the main hopper, rather than through main hopper 108 along with the polyamide resin and maleic anhydride functionalized polymer, to prevent the formation of excessively thickened polyamide materials, which may result in instability during extrusion, or even process failure due to an intolerable increase in melt pressure.

Feeders 102, 104, and 106 may be loss-in-weight feeders which have a less than 0.5 wt. % feeding accuracy as measured by weight loss feeders. However, it is within the scope of the present disclosure that alternate feeders may be used for feeders 102, 104, and 106.

Compounding extruder 110 compounds the components of the polyamide resin using mixing elements and forward kneading blocks in the mixing section disposed between the inlet of side feeder 106 and vacuum port 115. By mixing the components in the foregoing mixing section, a uniform distribution of the epoxy chain extender in the polyamide matrix is provided. In addition, low processing temperature and high output are preferred process parameters which are provided by an exemplary extruder such as compounding extruder 110.

After extrusion compounding, the polyamide is cooled at 112, such as in a water bath 112, dried at 114, such as via wind blowers, and then pelletized at 116. Thereafter, the resulting pellets may be further dried, such as for 4-6 hours at about 90° C., for example, to remove retained moisture.

b. Extrusion Foaming

Figure 2:
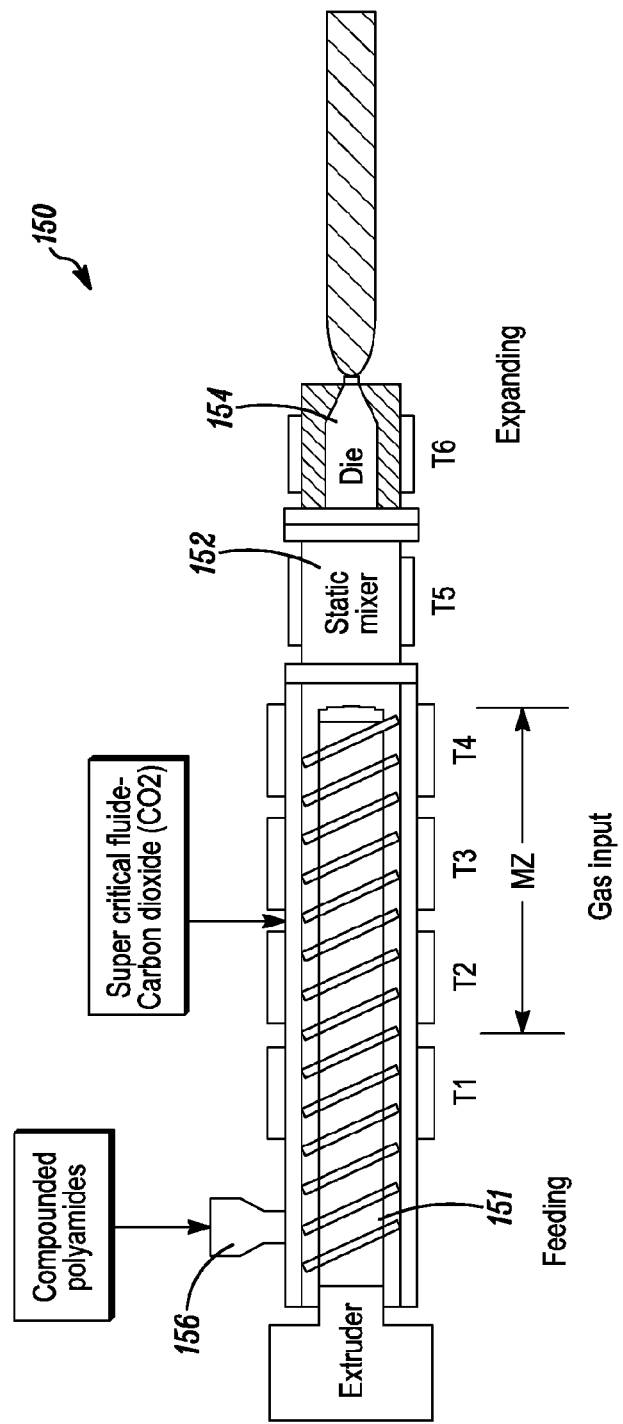
FIG. 2 is a schematic of a foaming extruder for use in preparing polyamide foams from compounded polyamide resins in accordance with the present disclosure.

After the compounding step described above, the compounded polyamide is extruded via foaming extruder 150, shown in FIG. 2, to form the polyamide foam composition. In one embodiment, foaming extruder 150 may be a single screw extruder, and may be equipped with one or more static mixing devices 152. Static mixing devices 152 have specific structure(s) to ensure the complete dissolution of a blowing agent in the melted polyamide materials within foaming extruder 150. In one embodiment, the blowing agent is supercritical carbon dioxide ($CO_2$), which is environmental friendly, inexpensive and inflammable in comparison to hydrocarbons and chlorofluorocarbons. However, it is within the scope of the present disclosure that alternate blowing agents may be used.

Referring to FIG. 2, the compounded polyamide is fed through hopper 156, and supercritical carbon dioxide is injected into a melting zone MZ (from T2 zone to T4 zone) of foaming extruder 150 by means of a metering unit (not shown) and then dissolved in the melted polyamide composite. The temperature of zone T1 closest to the hopper 156 is generally set relatively low, which may be as low as 130° C., 140° C., 150° C., 160° C., 170° C., or as high as 180° C., 190° C., 200° C., 210° C., 220° C. The melting zone MZ (from zone T2 to zone T4) of foaming extruder 150 may operate at a range of temperature, which may be as low as 220° C., 230° C., or 240° C., or as high as 270° C., 275° C., or 280° C., or within any range defined between any two of the foregoing values, such as between 220° C. and 280° C., between 230° C. and 275° C., or between 240° C. and 270° C., for example.

A substantially constant pressure is maintained throughout the foaming extruder 150 and, by operating at a constant pressure, a stable foaming process and formation of a homogenous cell structure of rod foams may be achieved.

After the mixture of polyamide and supercritical carbon dioxide is conveyed through extruder 151, the mixture is fed into static mixer 152 and a rod die 154. The operating temperature of static mixer 152 may be as low as 200° C., 205° C., or 210° C., or as high as 265° C., 270° C., or 275° C., or within any range defined between any two of the foregoing values, such as between 200° C. and 275° C., between 205° C. and 270° C., or between 210° C. and 265° C., for example. The operating temperature of rod die 154 may be as low as 200° C., 205° C., or 210° C., or as high as 265° C., 270° C., or 275° C., or within any range defined between any two of the foregoing values, such as between 200° C. and 275° C., between 205° C. and 270° C., or between 210° C. and 265° C., for example. Once the mixture exits die 154, the mixture expands to form the polyamide foam composition.

3. Properties of the Polyamide Foam Compositions

Polyamide foam compositions synthesized as described above exhibit an improved appearance, low density, and small cell size.

In one exemplary embodiment, the polyamide foam compositions have a density, measured according to ASTM D792, of as little as 0.1 g/m$^3$, 0.2 g/m$^3$, 0.4 g/m$^3$, or 0.6 g/m$^3$, or as great as 0.7 g/m$^3$, 0.8 g/m$^3$, 0.9 g/m$^3$, or 1.0 g/m$^3$, or within any range defined between any two of the foregoing values, such as 0.1 g/m$^3$ to 1.0 g/m$^3$; 0.2 g/m$^3$ to 0.9 g/m$^3$; 0.4 g/m$^3$ to 0.8 g/m$^3$, or 0.6 g/m$^3$ to 0.9 g/m$^3$, for example.

In one exemplary embodiment, the polyamide foam compositions have an average cell size, determined according to ASTM D3576-2004, of as little as 50 µm, 100 µm, 200 µm, or 300 µm, or as great as 400 µm, 500 µm, 600 µm, or 700 µm, or within any range defined between any two of the foregoing values, such as 50 µm to 700 µm; 100 µm to 600 µm; 200 µm to 500 µm, or 300 µm to 400 µm, for example.

Moreover, the polyamide composites formed by the compounding process exhibit an increase in viscosity and melt strength. Without wishing to be bound to any particular theory, it is believed that the addition of a composite chain extender contributes to increases in viscosity and melt strength of the polyamide foam.

In one exemplary embodiment, the polyamide composites have a shear viscosity, determined according to ASTM D4440, of as little as 10,000 Pa·s, 25,000 Pa·s, or 50,000 Pa·s, or as great as 100,000 Pa·s, 125,000 Pa·s, or 150,000 Pa·s, or within any range defined between any two of the foregoing values, such as 10,000 Pa·s to 150,000 Pa·s, 25,000 Pa·s to 125,000 Pa·s, or 50,000 Pa·s to 100,000 Pa·s, for example.

As shown in Table 1 below, viscosity is an indicator of the melt strength of the polyamide material. High viscosity indicates that the molecular weight and the branching degree of molecular chains are high, which results in high entanglement of molecular chains and thus high melt strength of the polyamide material.

As used herein, the phrase "within any range defined between any two of the foregoing values" literally means that any range may be selected from any two of the values listed prior to such phrase regardless of whether the values are in the lower part of the listing or in the higher part of the listing. For example, a pair of values may be selected from two lower values, two higher values, or a lower value and a higher value.

EXAMPLES

Example I

Effect of Chain Extenders on Shear Viscosity of Polyamide Composite Materials

The shear viscosity of the samples in this Example was determined by a parallel plate rheometer. The polyamide 6 (PA 6) resin (e.g., H95ZIT manufactured by AdvanSix Resins & Chemicals LLC used in this Example had a relative viscosity (RV) of 3.3. The epoxy chain extender used was CE311 sourced from Ningbo Seven New Material Technology Co., LTD. A first maleic anhydride grafted polypropylene MAPP) wax used was A-C® 950, having a Saponification number of 50 mg KOH/g, and manufactured by Honeywell. A second maleic anhydride-functionalized polypropylene (MAFP), Orevac® CA100 sold by Arkema, was also used, having a grafting rate of 1.1%. Finally, a third ethylene-octene elastomer grafted maleic anhydride (MA-EO) was used in certain samples within this Example. In this Example, Fusabond® N493, manufactured by DuPont, is used as an ethylene-octene elastomer grafted maleic anhydride and has an acid modification rate of 0.5%. Samples A-G compositional data are shown in Table 1 below.

TABLE 1

| No# | PA6 resin, (RV3.3, wt. %) | Epoxy Chain Extender (wt. %) | MAPP wax (wt. %) | MAFP (wt. %) | MA-EO (wt. %) | Shear viscosity (Pa · s, 0.1 r/s, 235° C.) |
|---|---|---|---|---|---|---|
| A | 100 | — | — | — | — | 1500 |
| B | 95 | — | 5 | — | — | 10000 |
| C | 98 | 2 | — | — | — | 20000 |
| D | 93 | 2 | 5 | — | — | 96000 |
| E | 88 | 2 | — | 10 | — | 55000 |
| F | 88 | 2 | — | — | 10 | 78000 |
| G | 92 | 3 | 5 | — | — | 140000 |

The compounding process to prepare Samples A-G was implemented using a co-rotating inter-meshing twin screw extruder (Leitritz 27 mm) generally indicated as 110 in FIG. 1. The components for each sample were accurately into the extruder in the proportion shown in Table 1 using weight loss feeders. Polyamide resin and MAFP were fed from the main throat (117, FIG. 1), and epoxy chain extender (CE311) was fed from side feeder (106, FIG. 1). The compound was then extruded, cooled in a water bath (112, FIG. 1), dried by wind blowers (114, FIG. 1), and then pelletized (116, FIG. 1). The resulting pellets were dried for between 4-6 hours at 90° C. to remove retained moisture.

The compounding extruder was operated at a screw speed of 450 revolutions per minute (rpm), and the barrel temperatures of extruder 110 varied from 180° C.-235° C.-235° C.-230° C.-225° C.-225° C.-225° C.-225° C.-235° C. (Die) depending on the location of extruder 110. Extruder 110 had a throughput of 15 kg/hr.

Polyamide resin and MAPP wax are fed into main throat 117 of the compounding extruder and conveyed by conveying screw elements. Due to the pitch decease within the compounding extruder, the mixture was compressed, and subjected to a strong shear force. In the melting zone of the compounding extruder, kneading blocks (2 forward kneading elements and 1 reversing kneading element with a 30 degree stagger angle) form a dam and operate to input mechanical energy to the mixture in order to fully melt the mixture. After the melting zone, the epoxy chain extender was incorporated through the side feeder where the mixture is again compressed by a steep pitch screw flight within the compounding extruder. Forward kneading blocks and mixing elements were used to prevent high shear heating which could result in many undesirable side reactions in the mixing section between the side feeder and vacuum port.

The first mixing zone of the compounding extruder was composed of 1 forward kneading block and 1 mixing element, and the second mixing zone of the compounding extruder was composed of 1 forward kneading block, 1 mixing element, and 2 wide pieces with 90 stagger angle for sealing purposes.

Shear viscosity was determined by a parallel plate rheometer (TA instruments AR2000ex rheometer) operating at an angular frequency of 0.1 radians per second, at a temperature of 235° C., and at a constant strain amplitude of 1.5%. Further, the shear viscosity testing was completed under Nitrogen atmospheric conditions.

Referring to the shear viscosity data provided in Table 1 above, it can be seen that samples including the compound chain extender including both the epoxy chain extender and the MAPP wax (Samples D and G) exhibited the greatest prominent effect on improving the viscosity of polyamide materials when compared with adopting a single chain extender or using other compound chain extension system which contains the epoxy chain extender and other maleic anhydride functionalized polymer (MAFP or MA-EO). Without wishing to be bound to a particular theory, the increase in shear viscosity of Samples D and G is that MAPP wax has higher concentrated functional groups than other maleic anhydride functionalized polymers (e.g., MAFP or MA-EO), which thereby improves the viscosity of polyamide material.

Example II

Effect of Chain Extenders and the Compounding Process on the Melt Stability of the Polyamide Composite Materials In this Example, the components for Samples H, I, D, J, K, and L are listed below in Table 2. The components listed in Table 2 are the same as those listed in Table 1 with the exception of MAPP wax II, which refers to a maleic anhydride grafted polypropylene wax with a Saponification number of 87 mg KOH/g (i.e., A-C®925P manufactured by Honeywell).

TABLE 2

| No# | PA6 resin, RV3.3, wt. % | Epoxy Chain Extender (wt. %) | MAPP wax (wt. %) | MAPP wax II (wt. %) | Compounding process | Shear viscosity (Pa · s, 0.1 r/s, 235° C.) |
|---|---|---|---|---|---|---|
| H | 94 | 1 | — | 5 | 450 rpm/ 15 kg/h | 42000 |
| I | 95 | 2 | 3 | — | 450 rpm/ 15 kg/h | 72000 |
| D | 93 | 2 | 5 | — | 450 rpm/ 15 kg/h | 96000 |
| J | 98 | 2 | — | — | 450 rpm/ 15 kg/h | 20000 |
| K | 98 | 2 | — | — | 250 rpm/ 10 kg/h | 48000 |
| L | 98 | 2 | — | — | 200 rpm/ 10 kg/h | 60000 |

Figure 3:
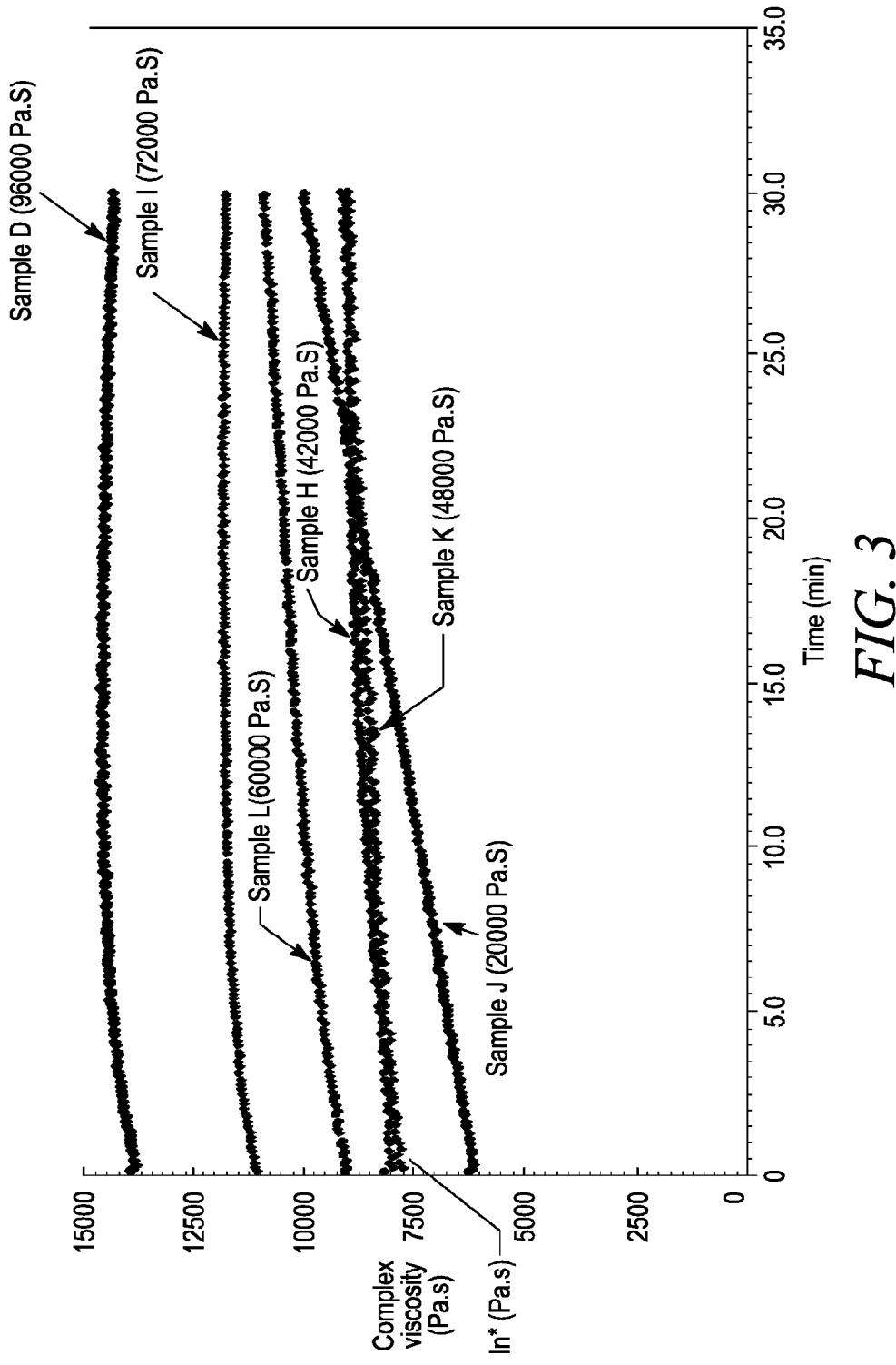
FIG. 3 relates to Examples I, II and III, and illustrates a graph showing complex viscosity versus time for the disclosed samples.
Figure 4:
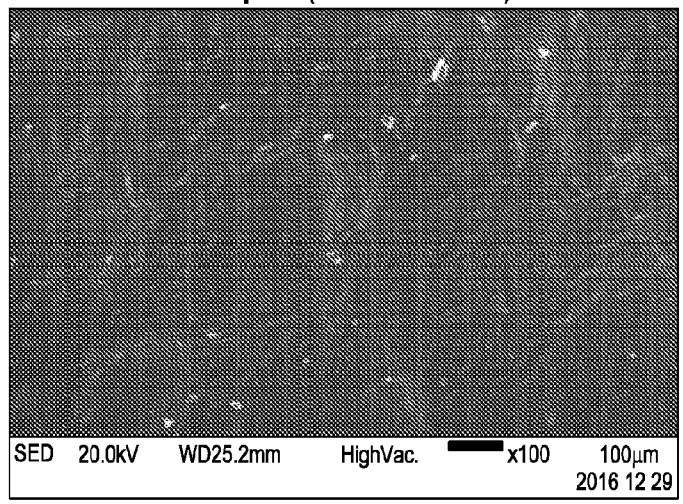
FIG. 4 relates to Examples I, II and III, and illustrates the surface morphology for Examples 1-9.
Figure 4:
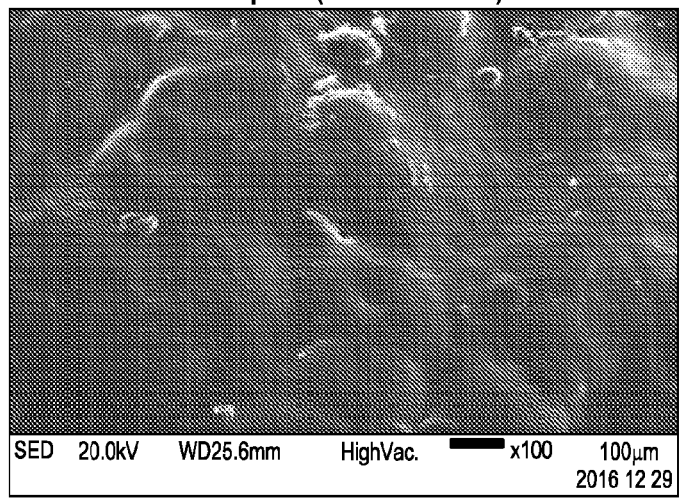
Figure 4:
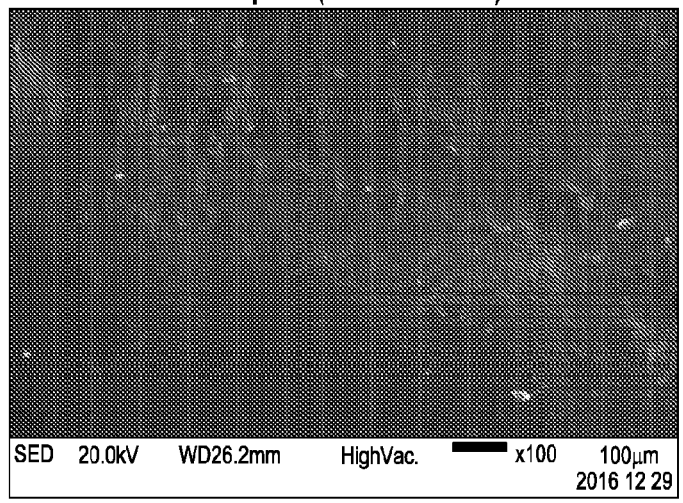
Figure 4:
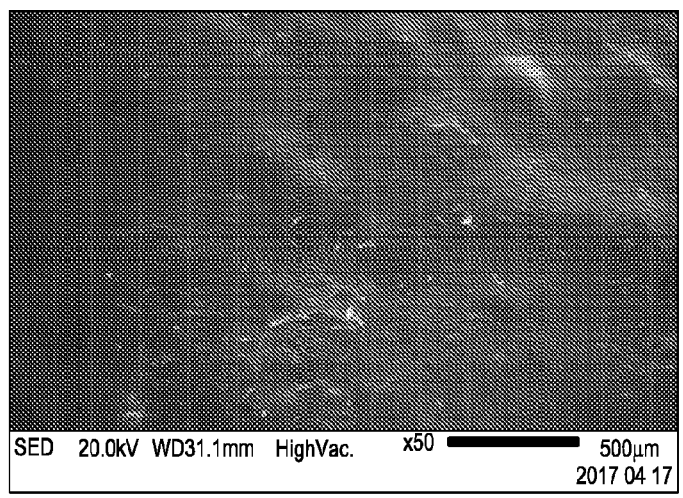
Figure 4:
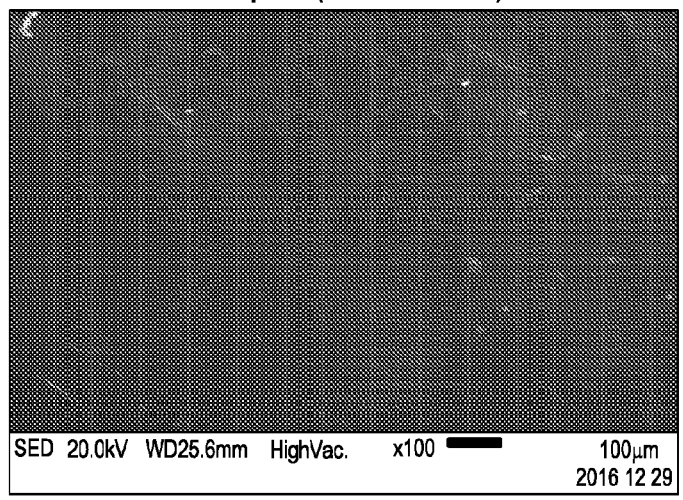
Figure 4:
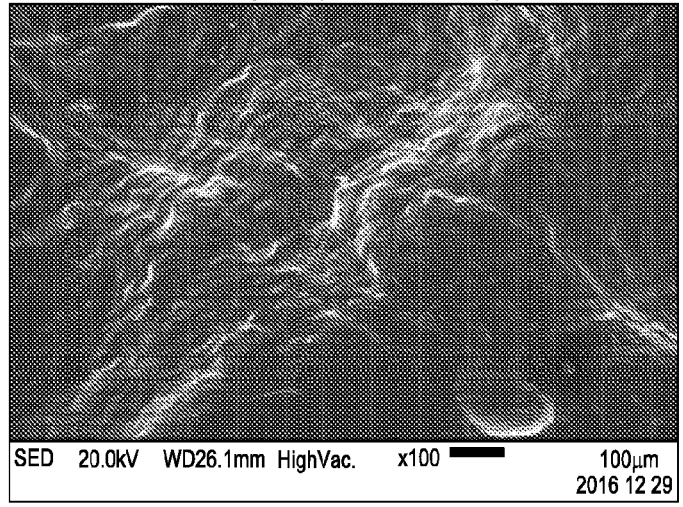
Figure 4:
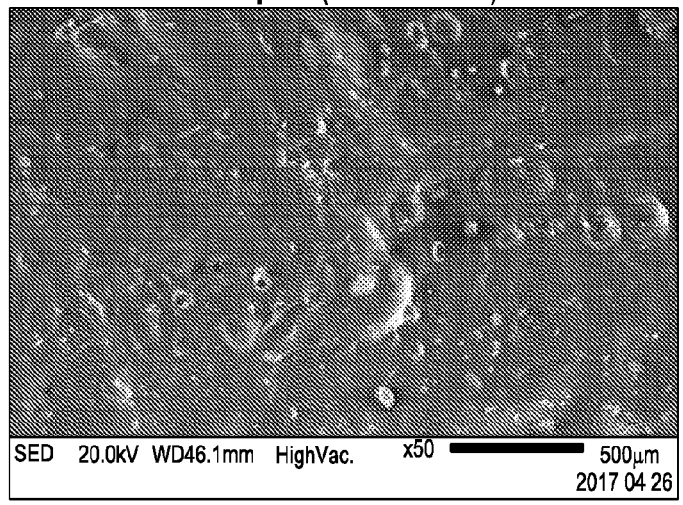
Figure 4:
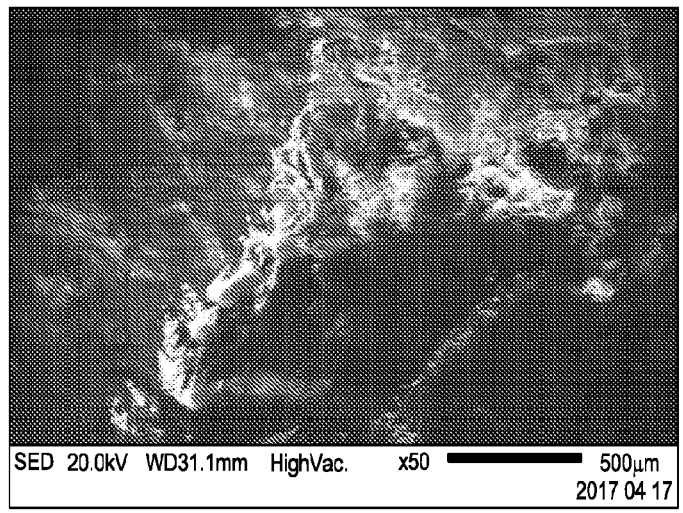
Figure 5:
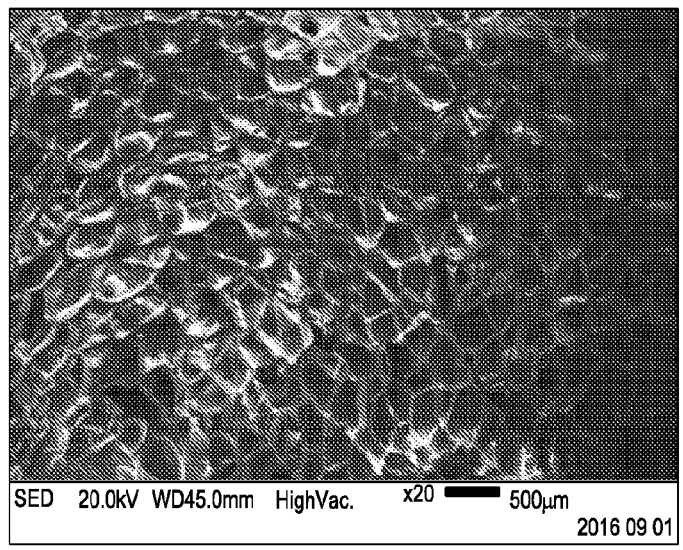
FIG. 5 relates to Examples I, II and III, and is a cross sectional view for Examples 1-9.
Figure 5:
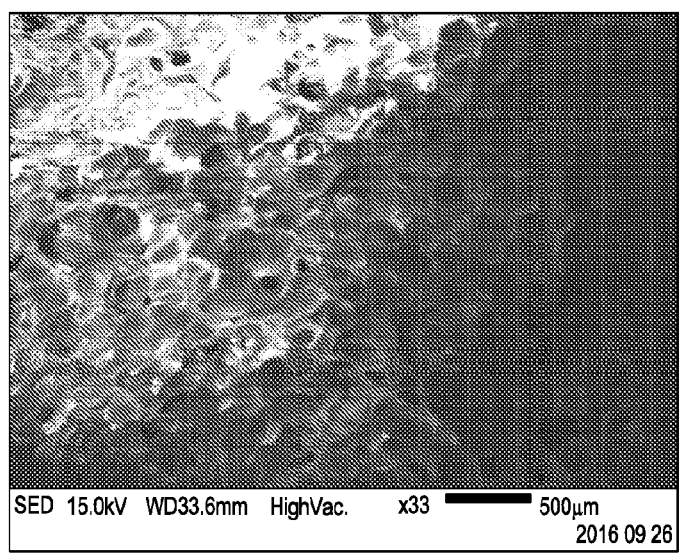
Figure 5:
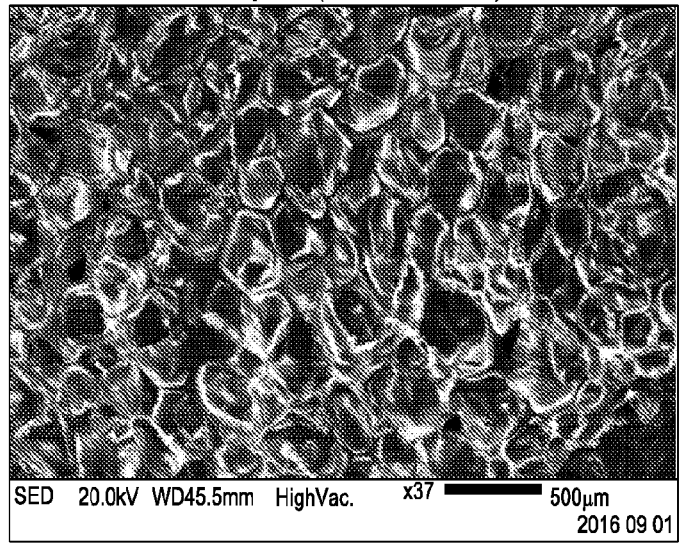
Figure 5:
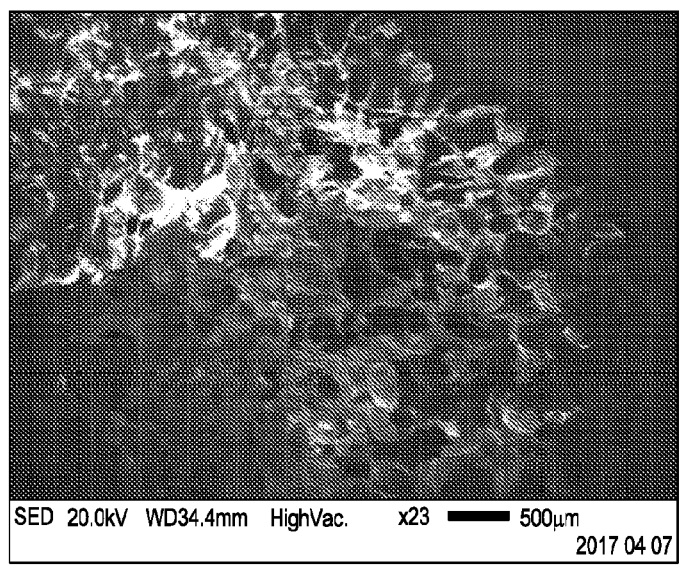
Figure 5:
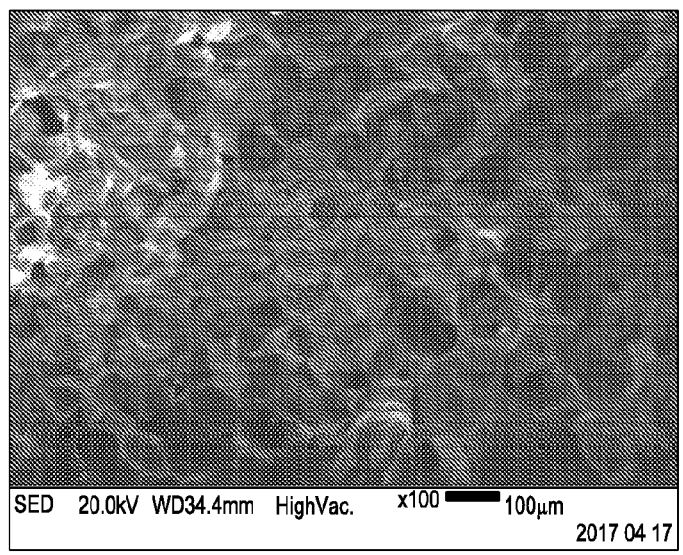
Figure 5:
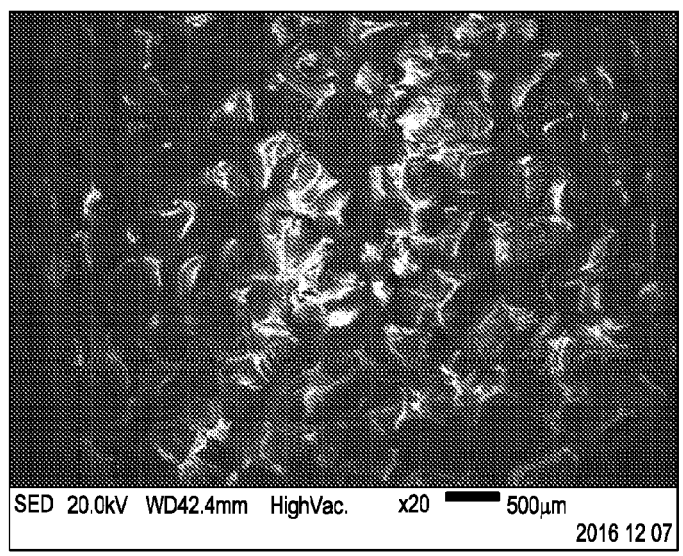
Figure 5:
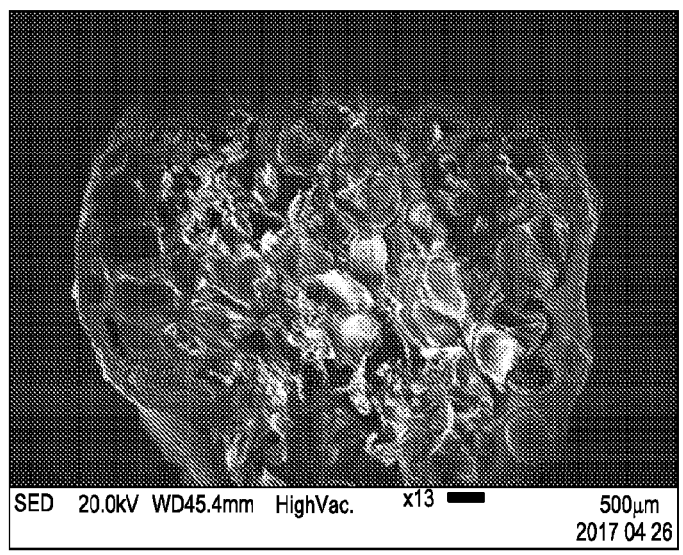
Figure 5:
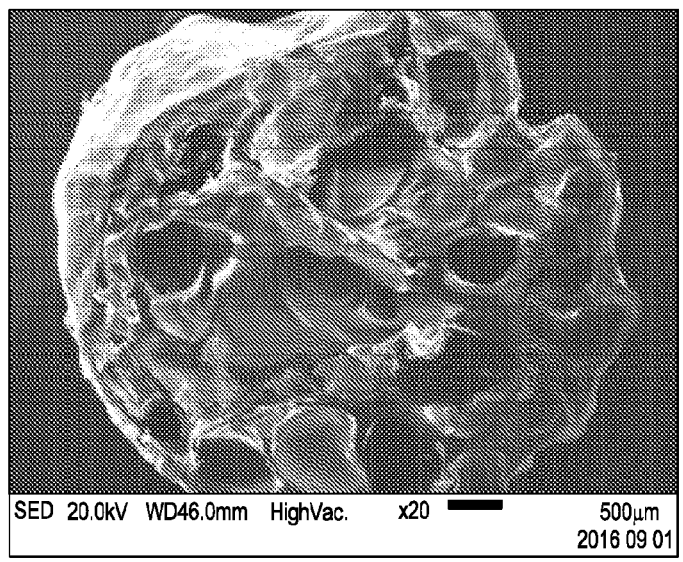

The melt stability of the compounded polyamide was evaluated by using a parallel plate rheometer (TA instruments AR2000ex rheometer) according to ASTM 4440 operating at a fixed oscillation frequency of 1 hertz (Hz), and the changes in complex viscosity were observed over a specified period of time (e.g., 30 mins). If the change in complex viscosity was large, poor melt stability for the Sample was exhibited. Otherwise, the melt stability of the test sample was determined to be acceptable. The testing temperature was set as 235° C. and the test was performed under Nitrogen atmospheric conditions. The results are shown in FIG. 3 and discussed further herein.

As shown in Table 2, samples J, K, and L were prepared with the same formula but by different compounding processes (i.e., different screw speeds and throughput). The data in Table 2 with reference to the complex viscosity graph of FIG. 3 indicate that the decrease of screw speed and throughput results in an increase in shear viscosity of polyamide composites, and an improvement in the melt stability (demonstrated by the relatively stable/flat curves for Samples K and L in FIG. 3).

Without wishing to be bound to a particular theory, the chain extension of polyamide molecular chains occurs during extrusion, and it is a reactive extrusion process. The decrease of screw speed and throughput results in a longer residence time for the polyamide resin within the extruder. A longer residence time yields a more complete reaction between the extender and polyamide resin, thereby, avoiding secondary reactions in processing steps occurring further downstream. From a further analysis of the rheological graph of FIG. 3, samples that contained a compound chain extender (epoxy chain extender+MAPP wax or MAPP wax II) exhibited good melt stability (e.g., Samples H, I, D). Furthermore, the melt stability of the polyamide composites can be improved by using the composite chain extender (epoxy chain extender+MAPP wax) instead of a single, epoxy chain extender can improve the melt stability of the final products, and by adding MAPP wax (or MAPP wax II) instead of decreasing production capacity or modifying equipment configuration to elongate the residence time within the extruder. Without wishing to be held to a particular theory, a reasonable explanation of the effect of MAPP wax (or MAPP wax II) on the melt stability of polyamide composites is that the MAPP wax (or MAPP wax II) has a high content of reactive maleic anhydride functional groups. When the reactive maleic anhydride functional groups react, a steric hindrance effect of the molecular chain inhibits further reaction of the remaining reactive maleic anhydride functional groups, thus avoiding the occurrence of secondary reactions in downstream processing steps.

Example III

Forming Behavior Study of Polyamide Composites with Different Viscosities

Table 3 below shows the compositions and shear viscosity of the trial samples, and Table 4 shows the foaming results for the samples. As shown in Table 3, the highest viscosity tested was 140000 Pa·s and the lowest viscosity tested was 20000 Pa·s. The components as listed in Table 3 correspond with the components of Tables 1 and 2 above, as applicable. Accordingly, a PA6/66 copolymer (PA6,66 resin) is experimented with for the extrusion foaming trials discussed further herein. The PA6,66 resin used is H133 (manufactured by Honeywell Shanghai Lab) with a PA66 content of about 23 wt %, a relative viscosity of 3.7, and a melting point of 190° C.

Extrusion foaming trials were carried out with a single screw extruder having a screw diameter of 45 mm and a length to diameter (L/D) ratio of 40 and a static mixer and a rod die with a diameter of 3 mm following the extruder. Supercritical fluid carbon dioxide was selected as a physical blowing agent because it is environmental friendly, inexpensive and inflammable in comparison to hydrocarbons and chlorofluorocarbons.

The compounded polyamide was fed manually through the hopper, and supercritical carbon dioxide was injected into the melting zone of the extruder by a metering unit. The supercritical carbon dioxide then dissolved in the melted compounded polyamide. The pressure was maintained throughout the extruder as a rapid pressure drop creates a homogenous cell structure of rod foams.

TABLE 3

| Sample No# | PA6 resin, (RV3.3, wt. %) | PA6.66 resin, (RV3.7, wt. %) | Epoxy Chain Extender (wt. %) | MAPP Wax (wt. %) | MAPP Wax II (wt. %) | MA-EO (wt. %) | Compounding process | Shear viscosity (Pa·s, 0.1 r/s, 235° C.) |
|---|---|---|---|---|---|---|---|---|
| G | 92 | — | 3 | 5 | — | — | 450 rpm/15 kg/h | 140000 |
| D | 93 | — | 2 | 5 | — | — | 450 rpm/15 kg/h | 96000 |
| F | 88 | — | 2 | — | — | 10 | 450 rpm/15 kg/h | 78000 |
| H | 94 | — | 1 | — | 5 | — | 450 rpm/15 kg/h | 42000 |
| K | 98 | — | 2 | — | — | — | 250 rpm/10 kg/h | 48000 |
| J | 98 | — | 2 | — | — | — | 450 rpm/15 kg/h | 20000 |
| M | — | 100 | — | — | — | — | —/— | 2950 |
| A | 100 | — | — | — | — | — | —/— | 1500 |

TABLE 4

| Example | Foam-ability (Y/N) | Appearance (smooth or not) | Density (g/m3) | Expansion rate | Bubble size (µm) |
|---|---|---|---|---|---|
| 1 (Corresponding to Sample G - 140000 Pa·S) | Y | ✓ | 0.2410 | 4.6 | 500 |
| 2 (Corresponding to Sample D - 96000 Pa·S) | Y | x | 0.8417 | 1.3 | 200 |
| 3 (Corresponding to Sample F - 78000 Pa·S) | Y | ✓ | 0.2907 | 3.8 | 400 |
| 4 (Corresponding to Sample H - 42000 Pa·S) | Y | ✓ | 0.2488 | 4.4 | 300 |
| 5 (Corresponding to Sample H - 42000 Pa·S) | Y | ✓ | 0.1373 | 8.3 | 100 |
| 6 (Corresponding to Sample K - 48000 Pa·S) | Y | x | 0.3582 | 3.1 | 600 |
| 7 (Corresponding to Sample J - 20000 Pa·S) | N | / | / | / | / |
| 8 (Corresponding to Sample M - PA6.66, 2950 Pa·S) | Y | x | 0.2680 | 4.2 | / |
| 9 (Corresponding to Sample A - PA6-H95ZIT, 1500 Pa·S) | N | / | / | / | / | a. Comparison of Example 1 and Example 3

The foaming conditions of Examples 1 and 3 are listed below in Table 5 where T1-T6 refer to locations in foaming extruder 150 of FIG. 2.

TABLE 5

| Foaming parameters | Example 1 (G - 140000 Pa·S) | Example 3 (F - 78000 Pa·S) |
|---|---|---|
| T1 (° C.) | 160 | |
| T2 (° C.) | 270 | |
| T3 (° C.) | 265 | |
| T4 (° C.) | 265 | |
| Temperature of static mixer (T5, ° C.) | 265 | |
| Temperature of die (T6, ° C.) | 255 | |
| Melt throughput (Kg/h) | 5 | |
| Gas injection (g/min) | 1.65 | |
| Die pressure (bar) | 7 | 9 |

As shown in the Table 5, Example 1 (Sample G) has a greater viscosity than Example 3 (Sample F), while Example 1 (Sample G) foamed at a lower die pressure. Therefore, the addition of MAPP wax can improve the processing ability of the foaming. Generally, high viscosity materials are more difficult to process than low viscosity materials. Under the same output and same processing temperature, the extrusion of the high viscosity material has higher equipment torque and higher die pressure than the extrusion of the low viscosity material. But in the present case, the result is the opposite, the extrusion of sample G (140000 Pa·S) has lower die pressure than that of sample F (78000 Pa·S), because sample G contains MAPP wax, and the lubricating effect of MAPP wax improves the processability of the high viscosity material and also reduces the die pressure.

Figure 6:
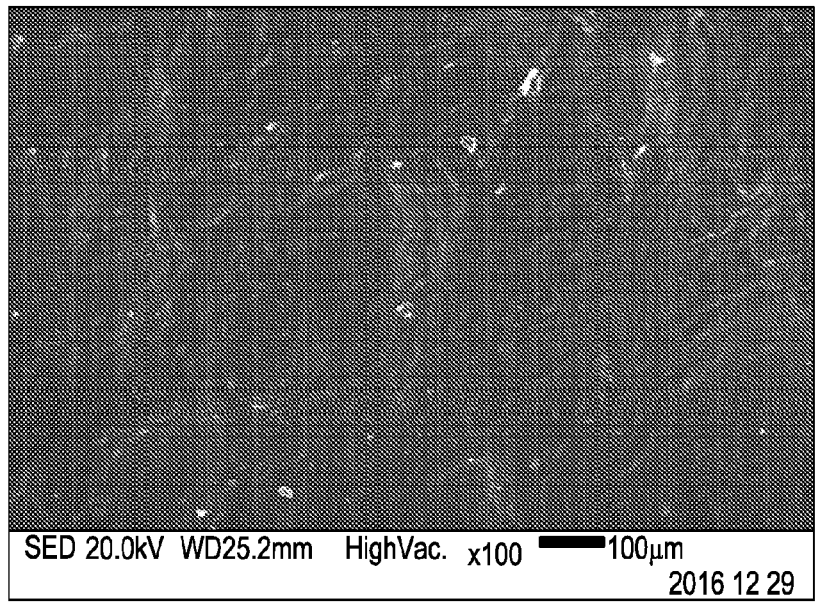
FIG. 6 relates to Example III, and illustrates the surface morphology for Examples 1 and 3.
Figure 6:
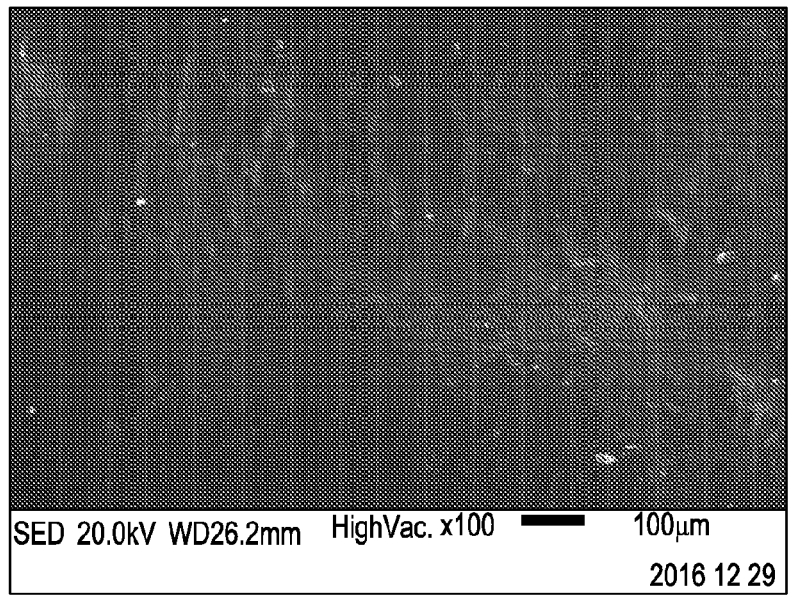
Figure 7:
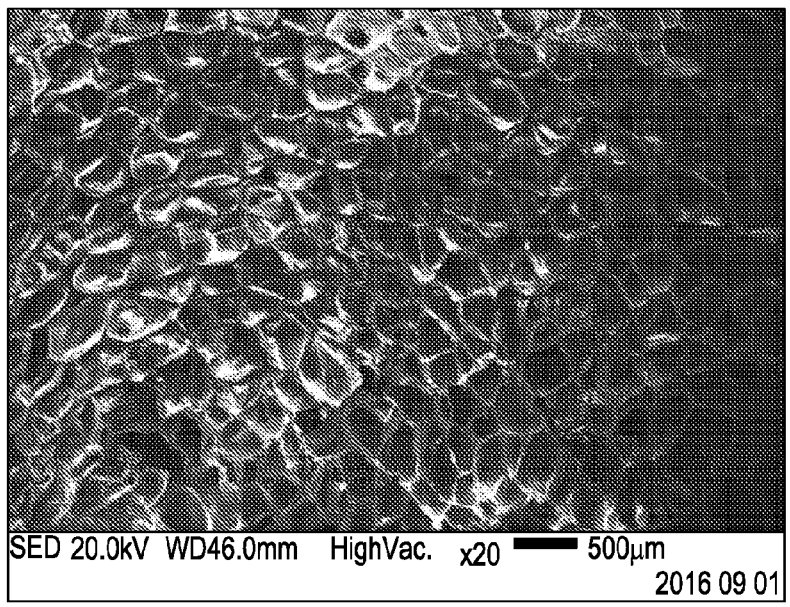
FIG. 7 relates to Example III, and is a cross sectional view for Examples 1 and 3.
Figure 7:
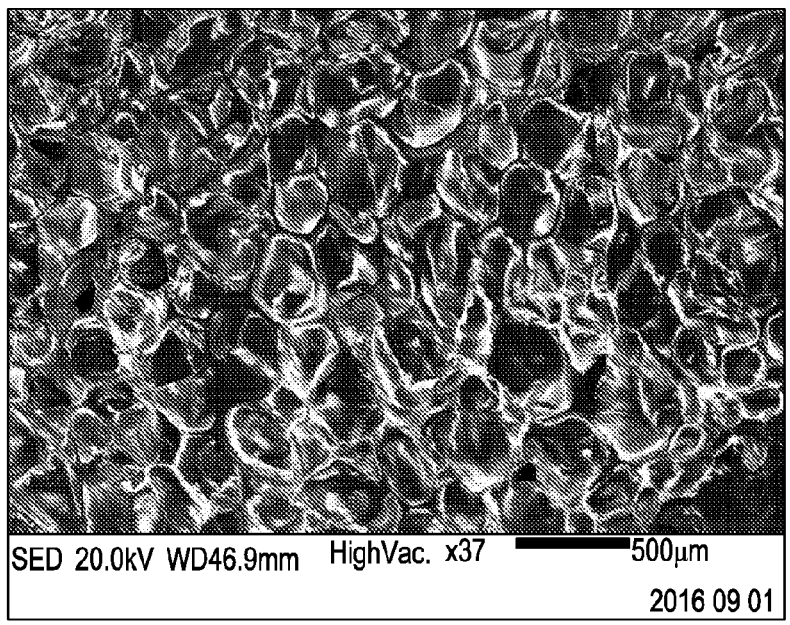

According to the foaming results shown in Table 4, both samples with high viscosities (Example 1 (sample G) and Example 3 (sample F)) were successfully foamed, and the polyamide foam compositions had a smooth surface and uniform cell structure as shown in the corresponding SEM images of FIGS. 6 and 7. The foam densities of Example 1 (Sample G (140000 Pa·S)) and Example 3 (sample F (78000 Pa·S)) are 0.2410 g/cm$^3$ and 0.2907 g/cm$^3$, respectively, and the cell size of Examples 1 and 3 (Samples G (140000 Pa·S) and F (78000 Pa·S), respectively) are 500 μm and 400 μm, respectively, as shown in Table 4 and FIG. 7.

b. Example 2

The foaming procedure (shown below) of Example 2 was similar to that of Example 1 and Example 3 with only a difference in the die temperature (T6) of 240° C. instead of 255° C. for Example 1 and Example 3.

TABLE 6

| Foaming parameters | Example 2 |
| --- | --- |
| T1 (° C.) | 160 |
| T2 (° C.) | 270 |
| T3 (° C.) | 265 |
| T4 (° C.) | 265 |
| Temperature of static mixer (T5, ° C.) | 265 |
| Temperature of die (T6, ° C.) | 240 |
| Melt throughput (Kg/h) | 5 |
| Gas injection (g/min) | 1.65 |
| Die pressure (bar) | 11-12 |

Figure 8:
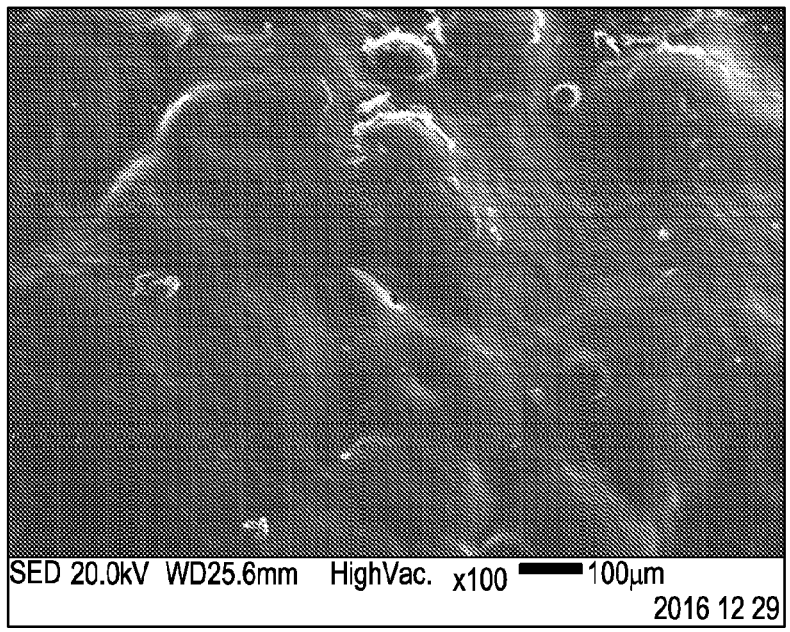
FIG. 8 relates to Example III, and illustrates the surface morphology for Example 2 and also shows a cross sectional view of Example 2.
Figure 8:
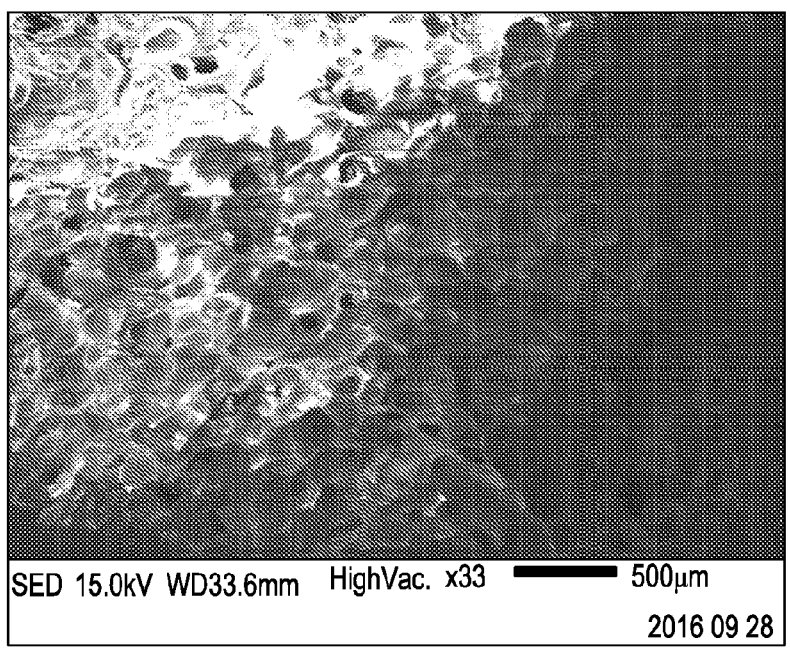

According to the foaming results shown in Table 4, Example 2 (Sample D (96000 Pa·s)) can also be foamed with its high viscosity. The resulting polyamide foam composition has a small cell size, but a relatively high density due to the high melt strength of the polyamide composites at a low temperature. This high melt strength has an inhibiting effect on the bubble growth and expanding, and therefore, results in a relatively high density and the formation of a small cell structure. The density and the cell size of foamed Example 2 (Sample D (96000 Pa·s)) are 0.8417 g/cm$^3$ and 200 μm, respectively as shown in the surface morphology and cross section view of FIG. 8 and in Table 4.

c. Example 6 & Example 7

As shown in Table 3, the viscosities of Examples 6 and 7 are relatively low. As shown in Table 7 below, the temperatures for the static mixer (T5) and the die (T6) have been reduced as compared to Examples 1, 2, and 3 discussed above.

TABLE 7

| Foaming parameters | Example 6 (K - 48000 Pas) | Example 7 (J - 20000 Pa · S) |
| --- | --- | --- |
| T1 (° C.) | 160 | 160 |
| T2 (° C.) | 270 | 270 |
| T3 (° C.) | 265 | 265 |
| T4 (° C.) | 255 | 255 |
| Temperature of static mixer (T5, ° C.) | 255 | 235 |
| Temperature of die (T6, ° C.) | 250 | 235 |
| Melt throughput (Kg/h) | 5 | 5 |
| Gas injection (g/min) | 1.1 | 1.1 |
| Die pressure (g/min) | 12-13 | / |

According to the foaming results of Table 4, Example 7 (Sample J (20000 Pa·s)) failed to foam. Furthermore, secondary reactions occurred during foaming which caused increase in the degree of cross-linking between the polyamide materials and the continual increase of the die pressure.

Figure 9:
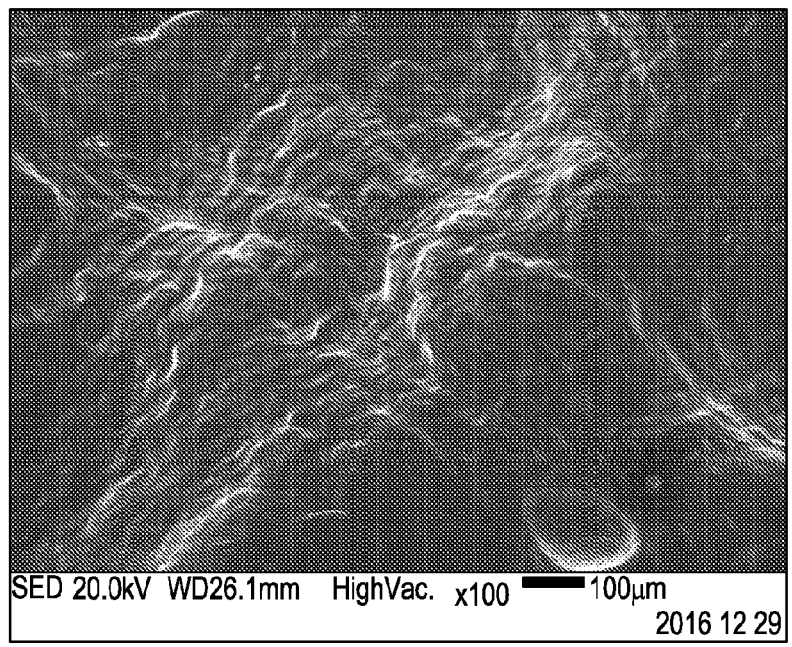
FIG. 9 relates to Example III, and illustrates the surface morphology for Example 6 and also shows a cross sectional view of Examples 6.
Figure 9:
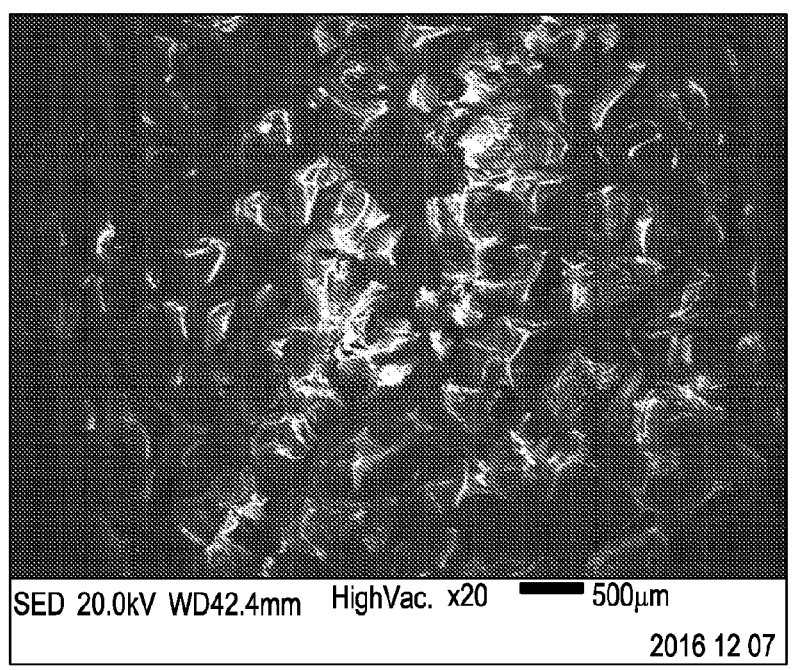

Conversely, Example 6 (sample K (48000 Pa·s)) foamed successfully and have corresponding rheological properties to those shown in FIG. 3. However, as shown in FIG. 9, the resulting polyamide foam composition prepared by Example 6 (Sample K (48000 Pa·s)) had a rough surface and a relative large cell size. The density and the cell size for Example 6 are 0.3582 g/cm$^3$ and 600 μm, respectively, as shown in the surface morphology and cross section view of FIG. 9 and in Table 4.

d. Comparing Example 8 & Example 9

Example 8 and Example 9 are composed of different polyamide resins. Examples 8 and 9 also had low melt strength. Moreover, the processing temperatures for Examples 8 and 9 were set relatively low close to the melting point of the resin in comparison to the Examples discussed above. The foaming conditions of Example 8 and Example 9 are shown below.

TABLE 8

| Foaming parameters | Example 8 (M-PA6.66 resin) | Example 9 (A-PA6 resin) |
| --- | --- | --- |
| T1 (° C.) | 130 | 180 |
| T2 (° C.) | 225 | 250 |
| T3 (° C.) | 220 | 260 |
| T4 (° C.) | 220 | 250 |
| Temperature of static mixer (T5, ° C.) | 210 | 235 |
| Temperature of die (T6, ° C.) | 210 | 235 |
| Melt throughput (Kg/h) | 5 | 5 |
| Gas injection (g/min) | 1.1 | 1.1 |
| Die pressure (bar) | 9-10 | 2-3 |

Figure 10:
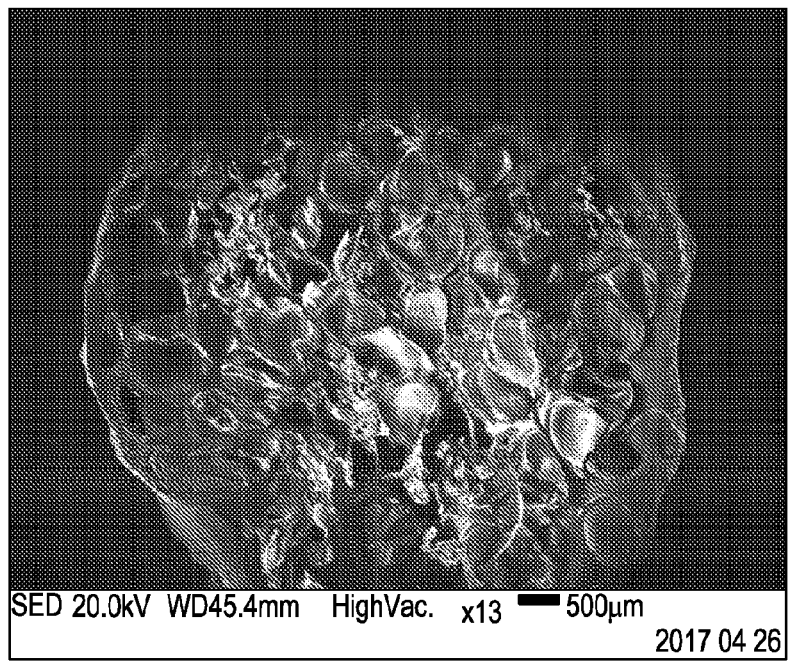
FIG. 10 relates to Example III, and illustrates a cross-sectional view of Examples 8 and 9.
Figure 10:
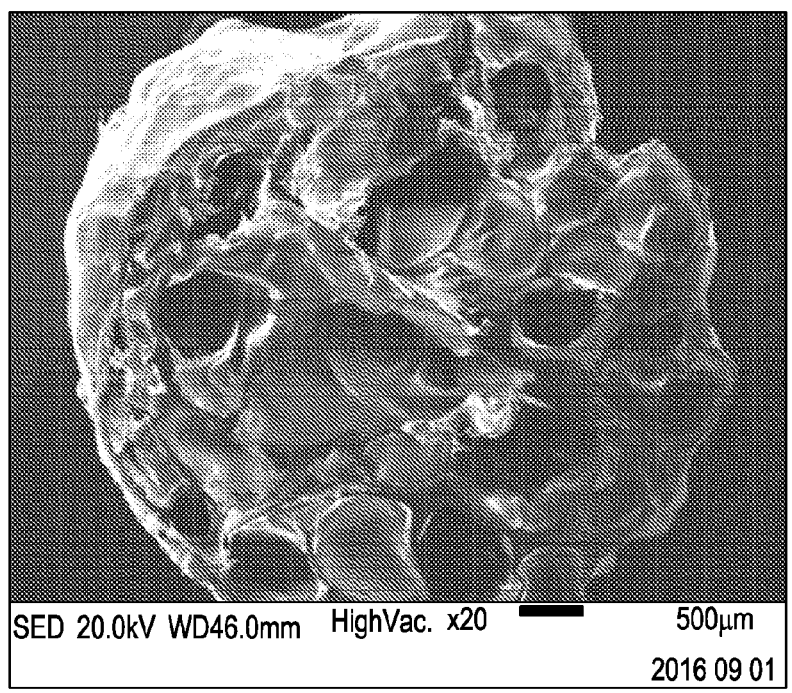
Figure 11:
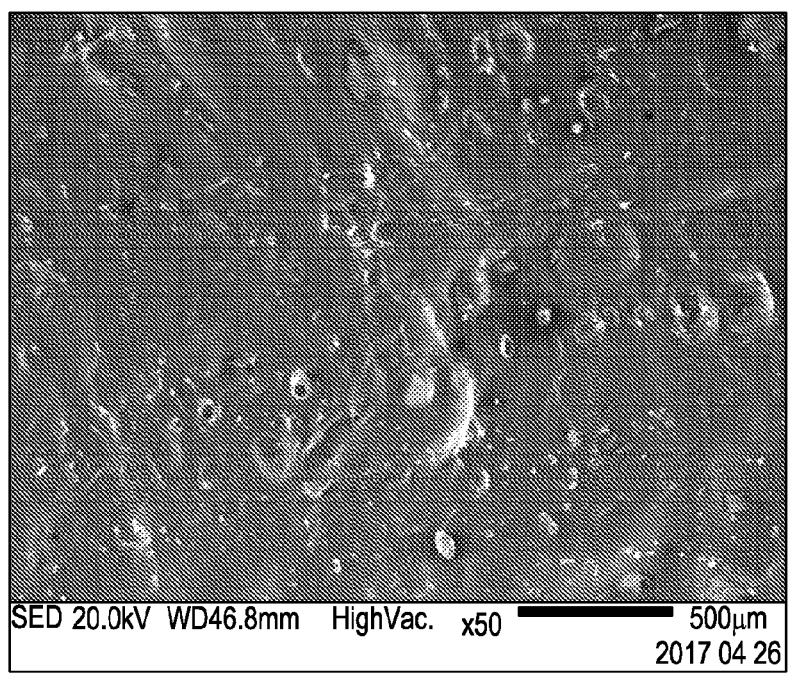
FIG. 11 relates to Example III, and illustrates the surface morphologies for Examples 8 and 9.
Figure 11:
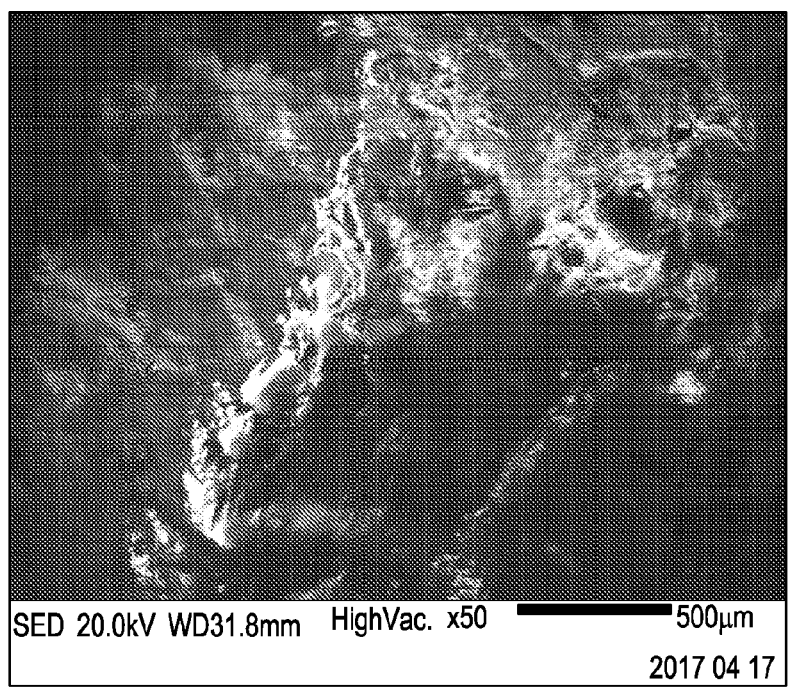

The foaming results shown in Table 4 and in the SEM images of FIG. 11 indicate that Example 9 (A-PA6 resin) failed to foam, while Example 8 (M-PA6,66 resin) has improved foam properties. The cross section view of Examples 8 and 9 are shown in FIG. 10 where Example 8 has a density of 0.268 g/cm$^3$ and Example 9 failed to foam. The surface morphology of Examples 8 and 9 are shown in FIG. 11 where Examples 8 and 9 both had rough surfaces.

e. Example 4

The foaming conditions of Example 4 within foaming extruder 150 (FIG. 2) is shown in below table.

TABLE 9

| Foaming parameters | Example 4 (H - 42000 Pa · S) |
|---|---|
| T1 (° C.) | 160 |
| T2 (° C.) | 270 |
| T3 (° C.) | 260 |
| T4 (° C.) | 250 |
| Temperature of static mixer (T5, ° C.) | 245 |
| Temperature of die (T6, ° C.) | 245 |
| Melt throughput (Kg/h) | 5 |
| Gas injection (g/min) | 1.1 |
| Die pressure (bar) | 5-6 |

Figure 12:
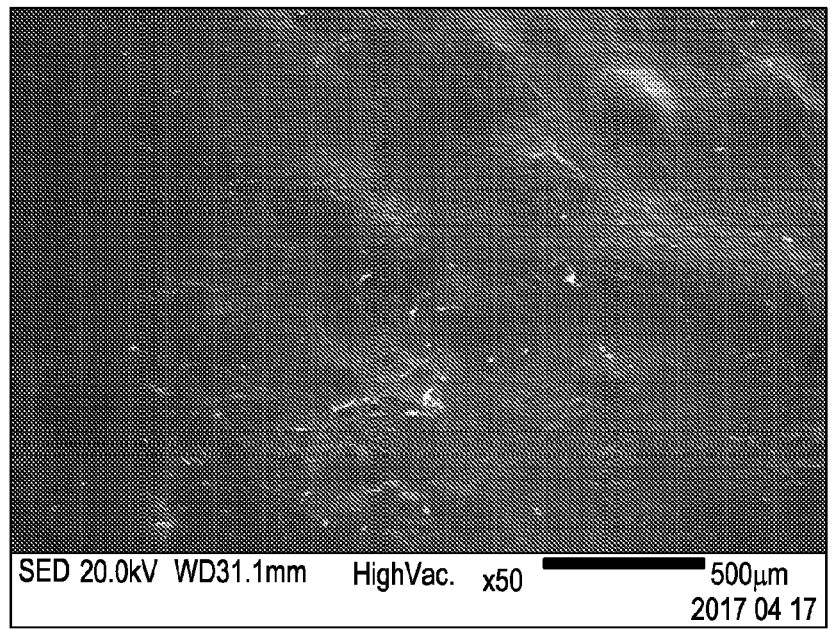
FIG. 12 relates to Examples III, and illustrates the surface morphologies for Examples 4 and 6.
Figure 12:
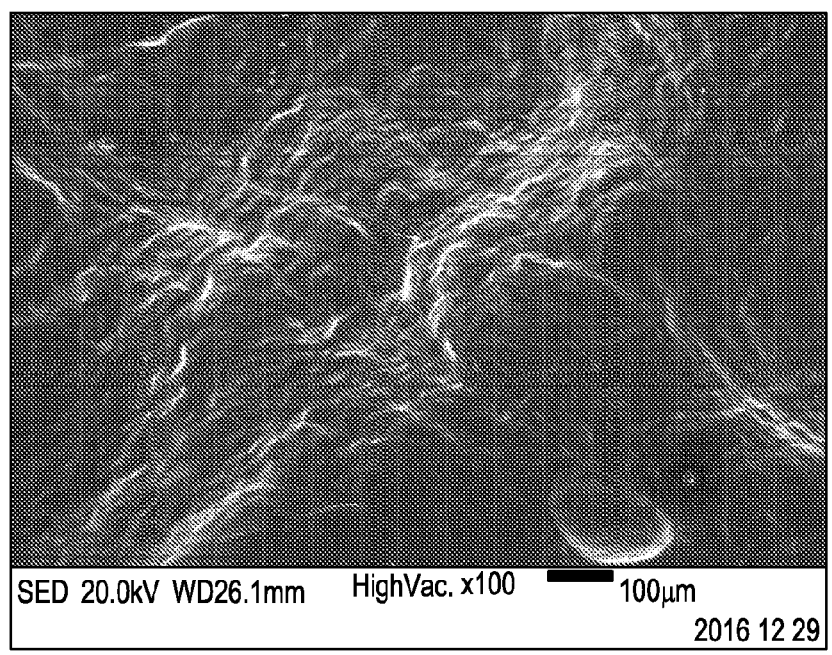
Figure 13:
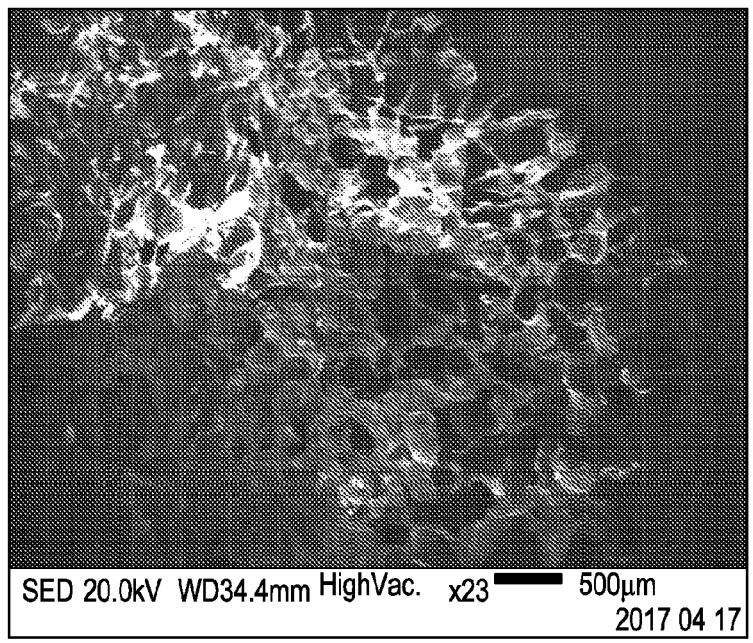
FIG. 13 relates to Example III, and illustrates a cross-sectional view of Examples 4 and 6.
Figure 13:
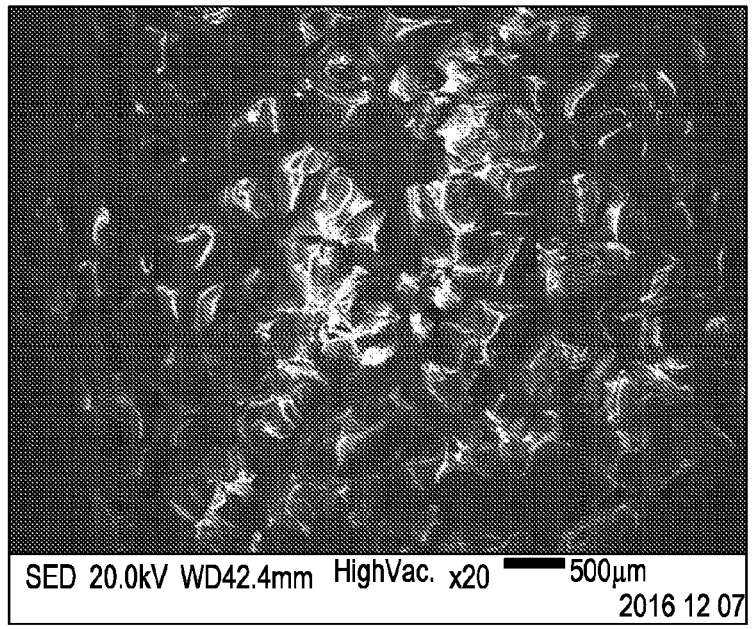

According to the foaming results shown in Table 4, Example 4 (Sample H (42000 Pa·s)) foamed successfully, and the polyamide foam compositions had a uniform cell structure. As shown in Table 3, Example 4 (Sample H (42000 Pa·s)) has a similar viscosity with Example 6 (Sample K (48000 Pa·s)). However, the foaming results of Table 4 and FIG. 12 showed that the foam of Example 4 (Sample H, 42000 Pa·s) has a smoother surface and smaller cell structure than the foam of Example 6 (Sample K, 48000 Pa·s). Moreover, the difference in appearance between Example 4 and Example 6 indicates that the addition of a MAPP wax (as in Example 4, MAPP wax II) favors the formation of a smooth surface on the polyamide foam. The density and the cell size of foamed Example 4 (Sample H (42000 Pa·s)) are 0.2488 g/cm$^3$ and 300 μm, respectively, as shown in the surface morphology and cross section view of FIG. 13 and in Table 4.

Figure 14:
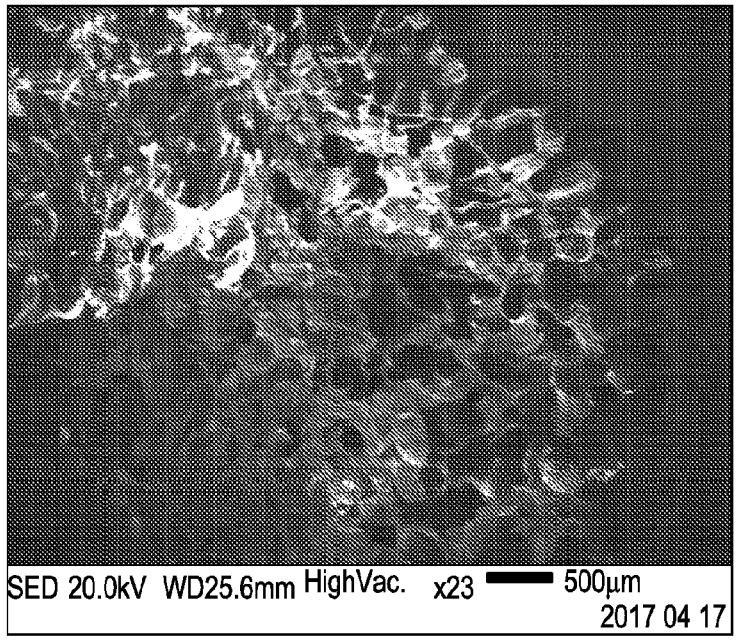
FIG. 14 shows before and after views for Example III relating to a method of preparation of polyamide foams.
Figure 14:
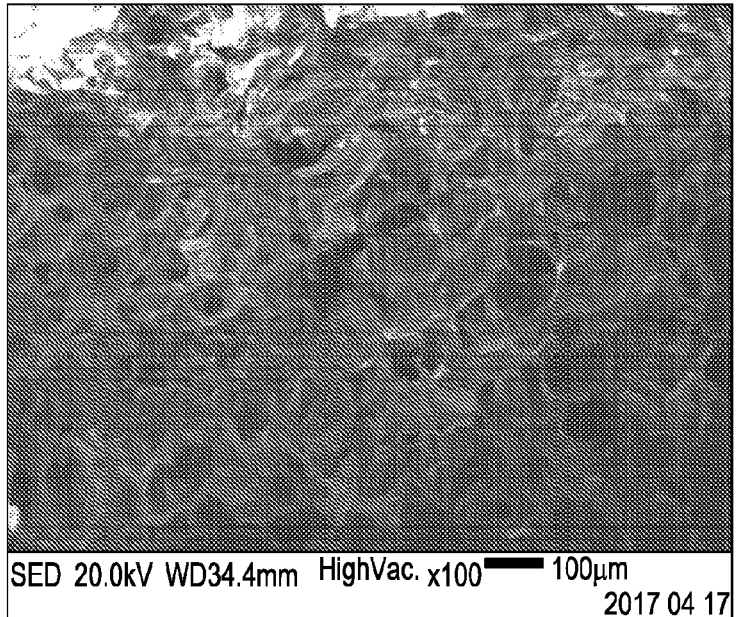

To obtain foams with better properties, such as density, appearance, and cell structure, material feeding was reduced while the gas continued to be injected into the extruder. After some time, foam samples with a smaller cell structure and a lower density were obtained as shown in FIG. 14. Without wishing to be held to a particular theory, improved foam properties were realized because a longer residence time of polyamide composites within the extruder due to the change in operation parameters mentioned above. By increasing the residence time, a more complete dissolution of the physical blowing agent in the melted polyamide composites, and thus resulting in the formation of low density foams.

f. Example 5—Improvements Upon Example 4

Based on the above findings, the foaming equipment was updated by adding one additional static mixer, and the residence time of polyamide materials in the extruder was increased from 15 minutes to 20 minutes. The foaming conditions of Example 5 are similar to that of Example 4 except for a difference in the gas injection rate of 2.2 g/min instead of 1.1 g/min used for Example 4. The whole foaming process is continuous and stable.

Figure 15:
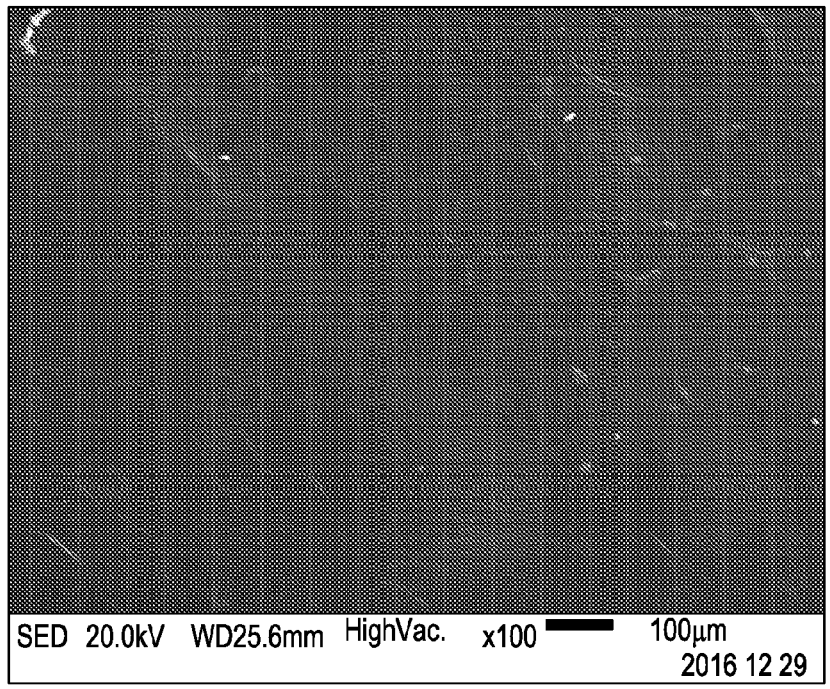
FIG. 15 relates to Example III and illustrates both the surface morphology and a cross sectional view of Example 5.
Figure 15:
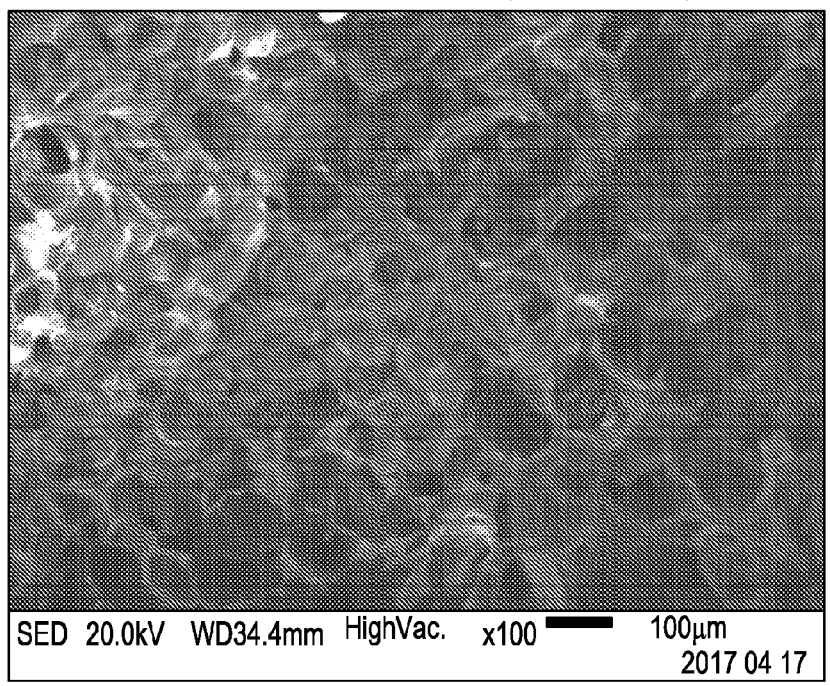

A polyamide foam composition with a lower density and a smaller cell size was obtained as a result of the altered processing parameters. The density of the Example 5 foam composition was 0.1373 g/cm$^3$ and the cell size was 100 μm. The surface morphology (via SEM) and cross section view were shown in FIG. 15.

While this disclosure has been described as relative to exemplary designs, the present disclosure may be further modified within the spirit and scope of this disclosure. Further, this application is intended to cover such departures from the present disclosure as come within known or customary practice in the art to which this disclosure pertains.

The invention claimed is:

1. A polyamide foam composition, comprising:
a polyamide resin; and
a composite chain extender including an epoxy chain extender and a maleic anhydride grafted polypropylene (MAPP) wax, wherein the polyamide resin is present in an amount of between 92 wt.% and 98 wt.%, based on the total weight of the polyamide foam composition.

2. The polyamide foam composition of claim 1, wherein the epoxy chain extender is present in an amount of between 1 wt. % and 3 wt. %, based on the total weight of the polyamide foam composition.

3. The polyamide foam composition of claim 1, wherein the MAPP wax is present in an amount between 1 wt. % and 5 wt. %, based on the total weight of the polyamide foam composition.

4. The polyamide foam composition of claim 1, wherein the polyamide foam composition has an average cell size between 50 μm and 700 μm.

5. The polyamide foam composition of claim 1, wherein the polyamide foam composition has a shear viscosity between 10,000 Pa·s to 150,000 Pa·s.

6. The polyamide foam composition of claim 1, wherein the density of the polyamide foam composition is between 0.1 g/cm$^3$ and 1.0 g/cm$^3$.

7. The polyamide foam composition of claim 1, further comprising at least one additive selected from antioxidants, nucleating additives, pigments, fire retardants, antistatic additives, and ultraviolet (UV) stabilizers.

8. A method of producing a polyamide foam composition, comprising the steps of:
a compounding step, comprising:
feeding a polyamide resin and a maleic anhydride grafted polypropylene (MAPP) wax into an extruder at a first location; and
feeding an epoxy chain extender into the extruder at a second location downstream from the first location to form a compounded polyamide; and
an extrusion foaming step, comprising:
extruding the compounded polyamide with a blowing agent in an extruder to form a polyamide foam.

9. The method of claim 8, wherein said compounding step further comprises, after said feeding step, the additional steps of:
cooling the compounded polyamide;
drying the compounded polyamide; and
pelletizing the compounded polyamide.

10. The method of claim 8, wherein said compounding step is carried out using one of a co-rotating twin screw extruder, a counter-rotating intermeshing twin screw extruder and a single screw extruder.

11. The method of claim 8, wherein said extruding step further comprises the additional steps of:
feeding the compounded polyamide into the extruder at a first location;
adding a physical blowing agent to the compounded polyamide in the extruder at a second location downstream of the first location;
mixing the compounded polyamide and the blowing agent in a static mixer; and conveying the compounded polyamide and the blowing agent through a die to form the polyamide foam composition.

12. The method of claim 11, wherein the blowing agent is supercritical carbon dioxide.

13. The method of claim 8, wherein the polyamide foam composition comprises:
   polyamide resin in an amount between 92 wt. % and 98 wt. %;
   epoxy chain extender in an amount between 1 wt. % and 3 wt. %; and
   MAPP wax in an amount between 1 wt. % and 5 wt. %, based on the total weight of the polyamide foam composition.

14. The method of claim 8, wherein the polyamide foam composition has at least one of the following properties:
   an average cell size between 50 μm and 700 μm;
   a shear viscosity between 10,000 Pa·s to 150,000 Pa·s; and
   a density between 0.1 g/cm$^3$ and 1.0 g/cm$^3$.

* * * * *